Figure 1:
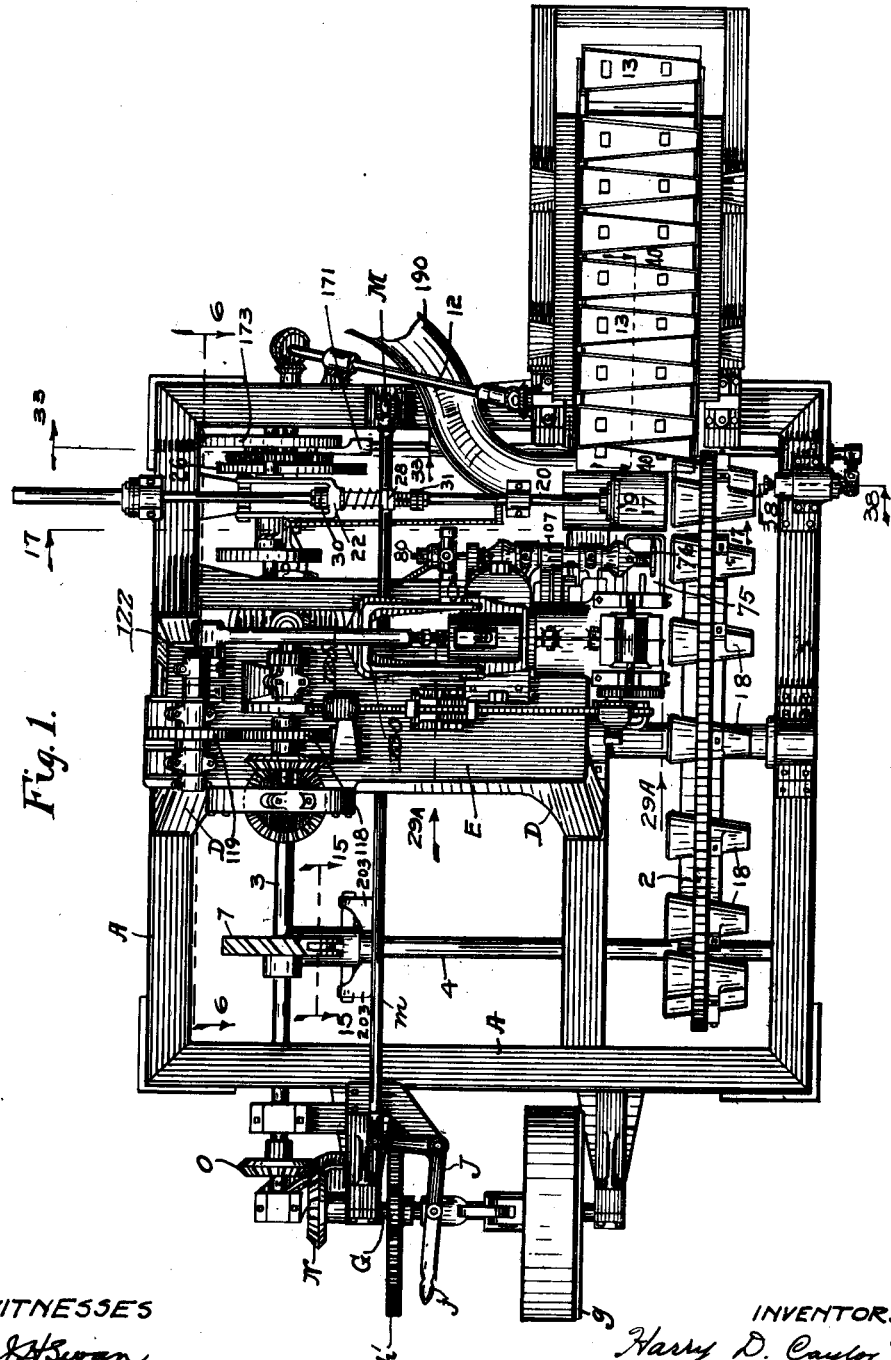

H. D. CAYLOR & W. A. SCOTT.
PAPER BOTTLE BOTTOMING MACHINE.
APPLICATION FILED NOV. 9, 1912.

1,164,921.

Patented Dec. 21, 1915.
16 SHEETS—SHEET 4.

WITNESSES:

INVENTORS
Harry D. Caylor, and
William Allison Scott;
by Minturn & Woerner,
ATTORNEYS.

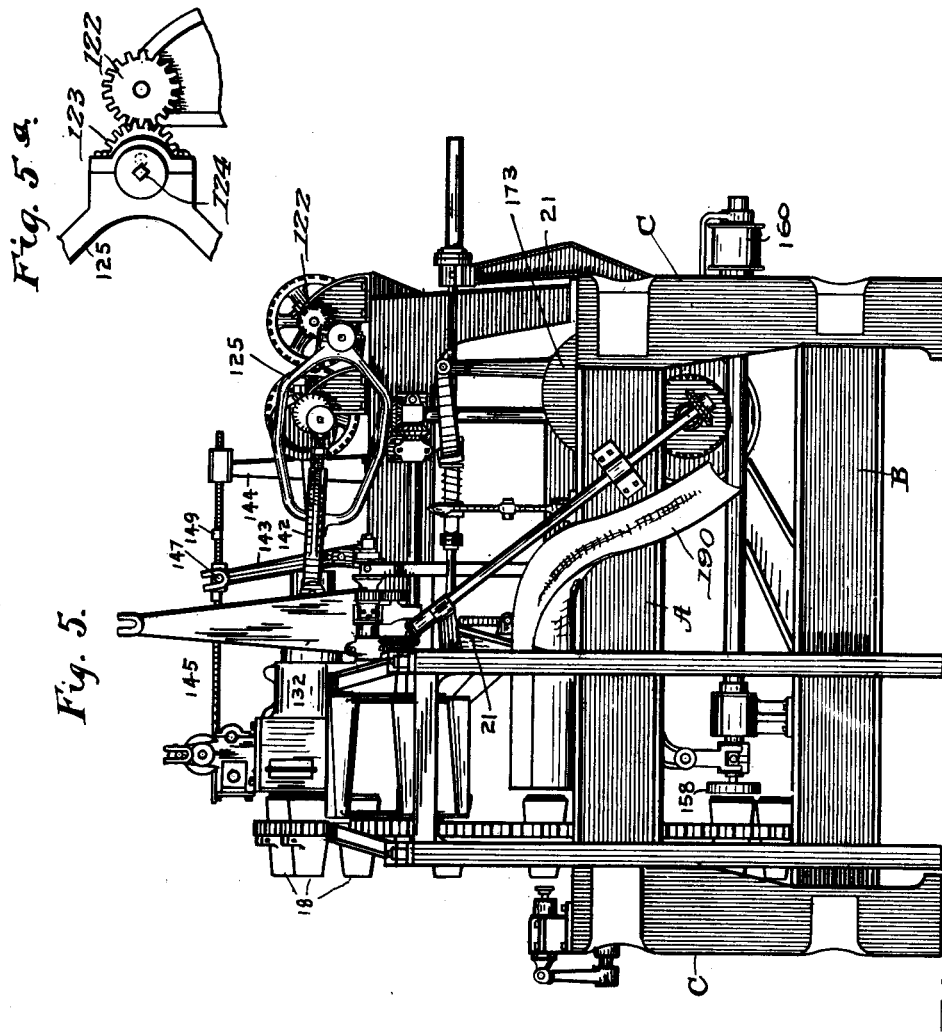

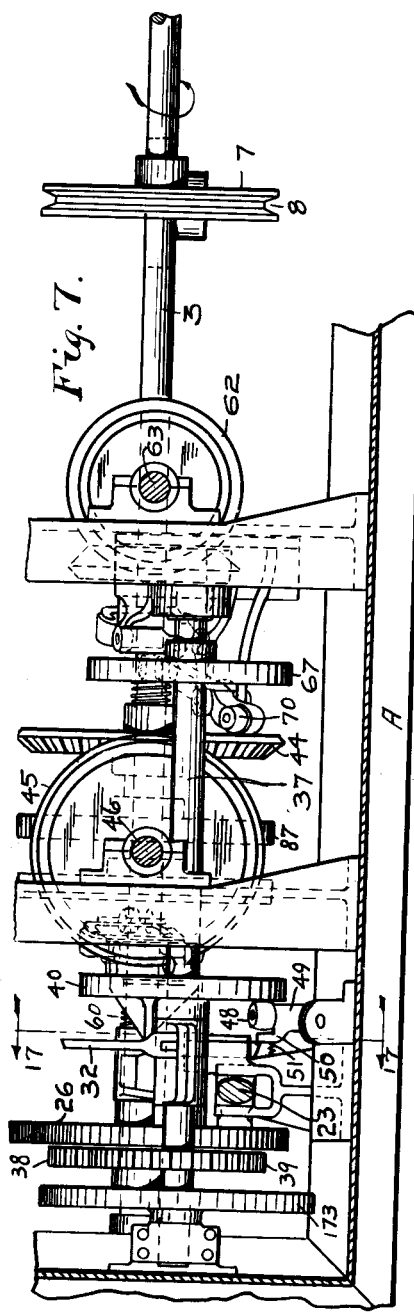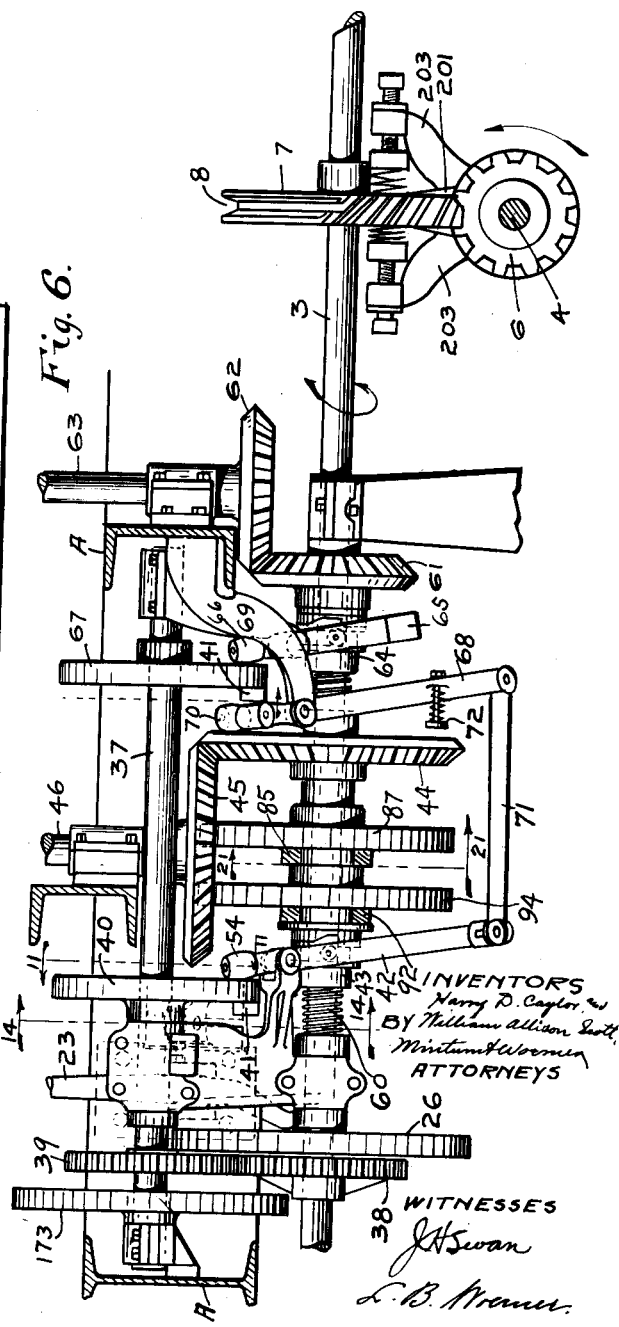

H. D. CAYLOR & W. A. SCOTT.
PAPER BOTTLE BOTTOMING MACHINE.
APPLICATION FILED NOV. 9, 1912.

1,164,921.

Patented Dec. 21, 1915.
16 SHEETS—SHEET 7.

WITNESSES:

INVENTORS
Harry D. Caylor, and
William Allison Scott,
By Minturn & Worner,
ATTORNEYS.

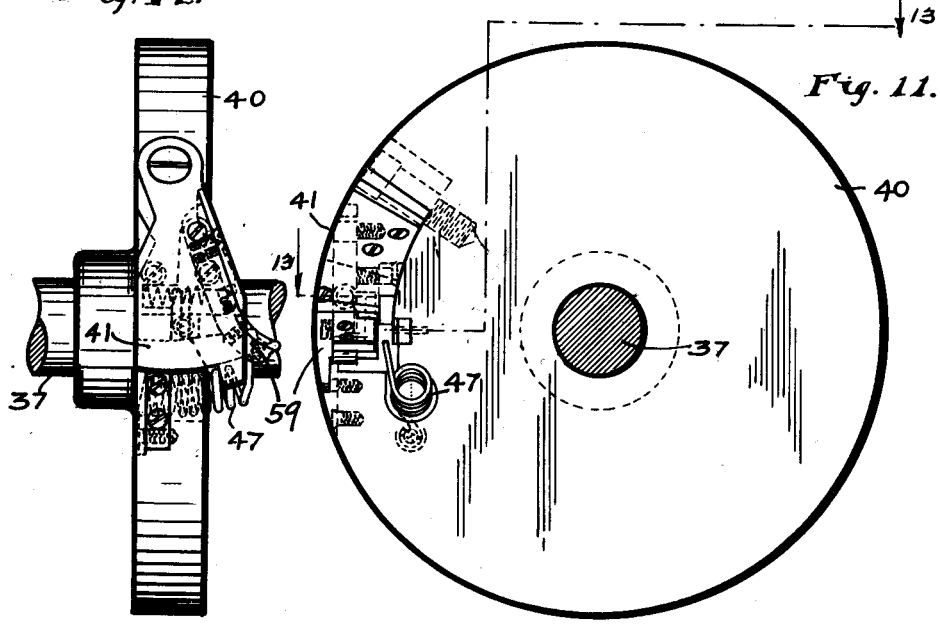

H. D. CAYLOR & W. A. SCOTT.
PAPER BOTTLE BOTTOMING MACHINE.
APPLICATION FILED NOV. 9, 1912.

1,164,921.

Patented Dec. 21, 1915.
16 SHEETS—SHEET 9.

WITNESSES:

INVENTORS
Harry D. Caylor, and
William Allison Scott.
BY Minturn & Woerner,
ATTORNEYS.

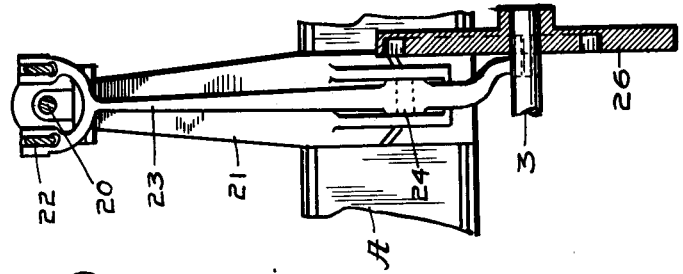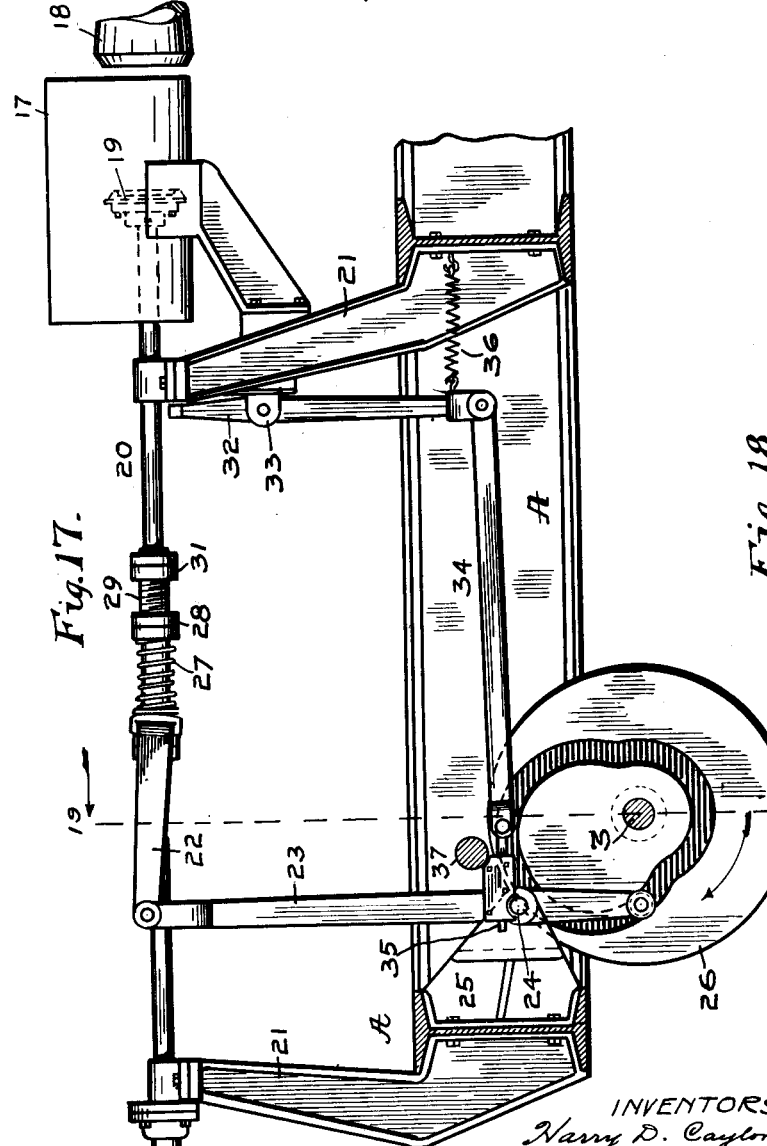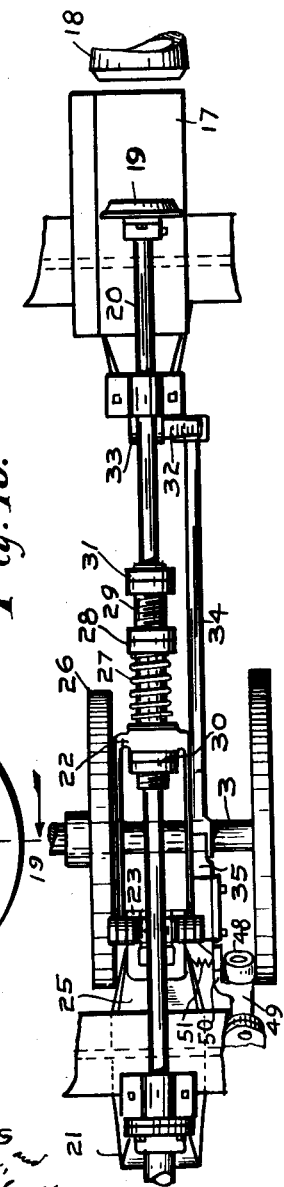

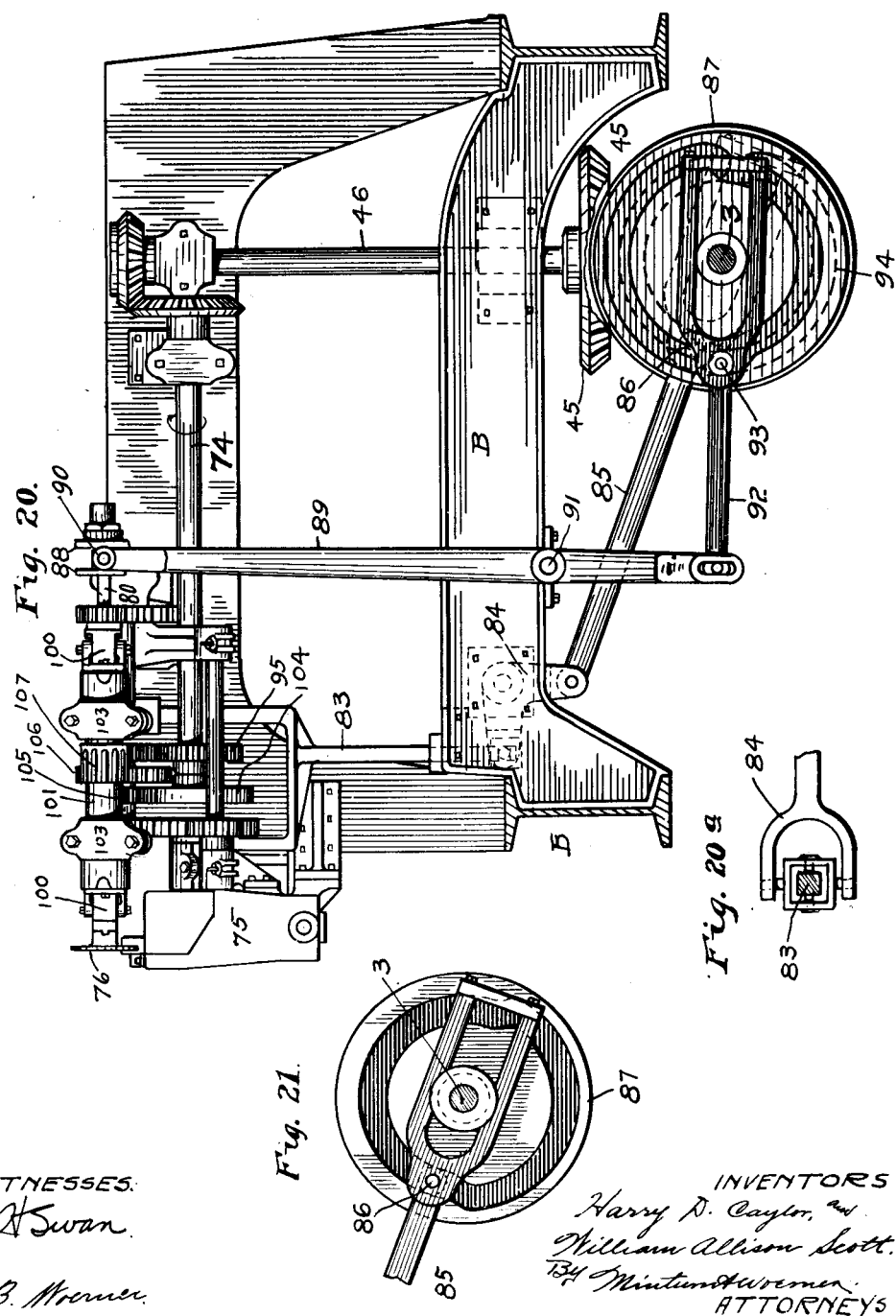

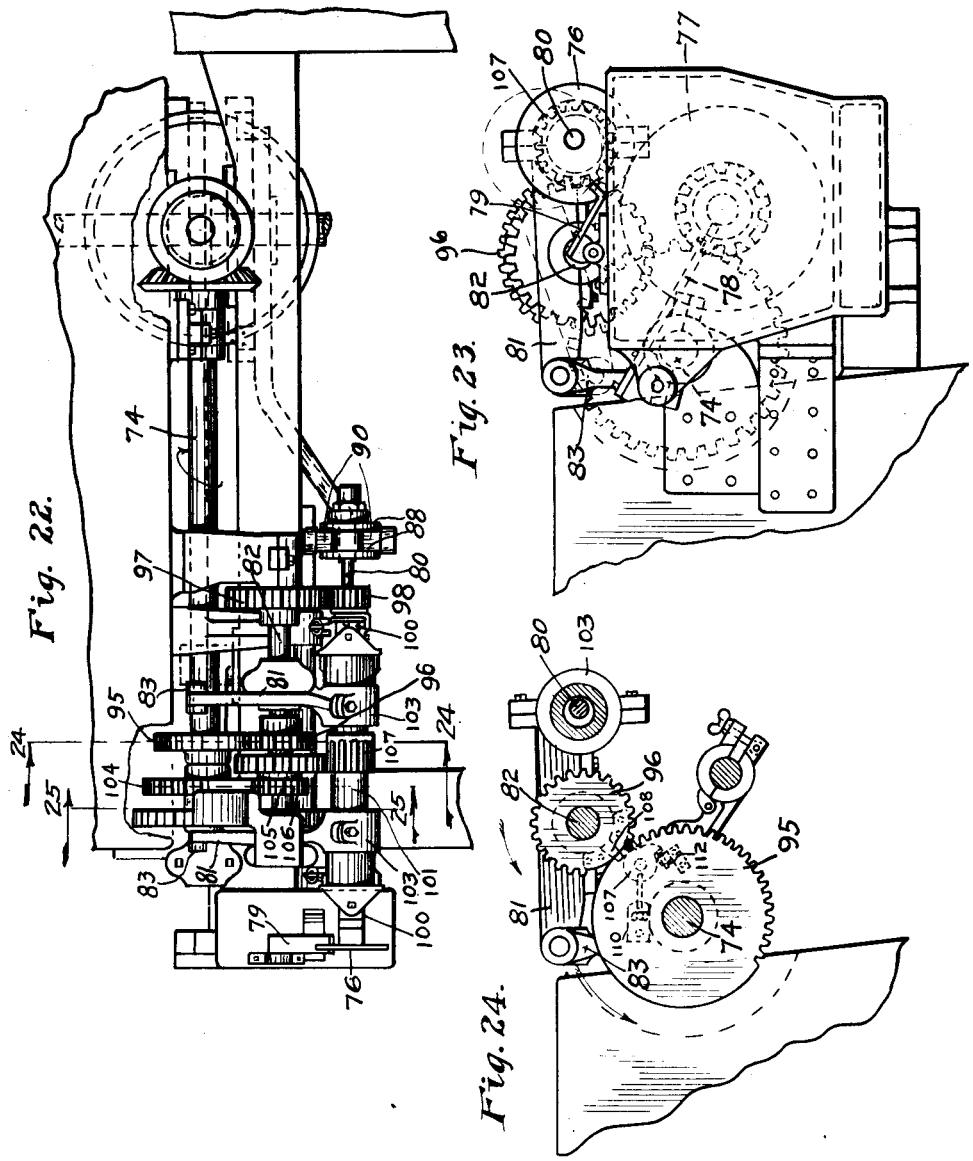

H. D. CAYLOR & W. A. SCOTT.
PAPER BOTTLE BOTTOMING MACHINE.
APPLICATION FILED NOV. 9, 1912.

1,164,921.

Patented Dec. 21, 1915.
16 SHEETS—SHEET 13.

WITNESSES:
J H Swan.
L. B. Wremer.

INVENTORS
Harry D. Caylor, and
William Allison Scott.
BY Minturn H Worner,
ATTORNEYS.

H. D. CAYLOR & W. A. SCOTT.
PAPER BOTTLE BOTTOMING MACHINE.
APPLICATION FILED NOV. 9, 1912.
1,164,921.
Patented Dec. 21, 1915.
16 SHEETS—SHEET 14.
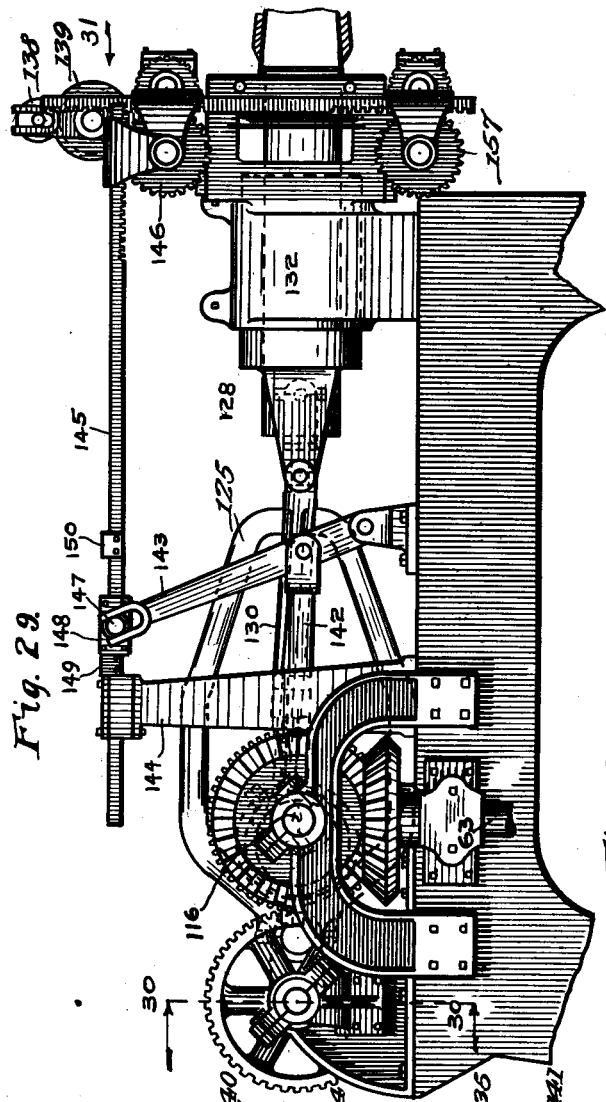
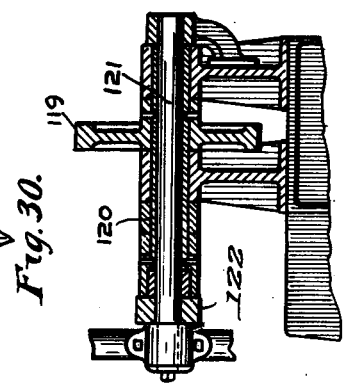
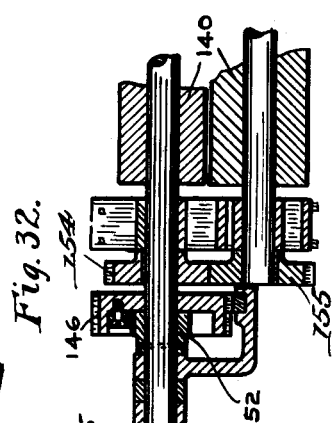
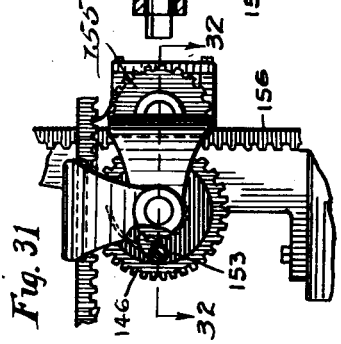
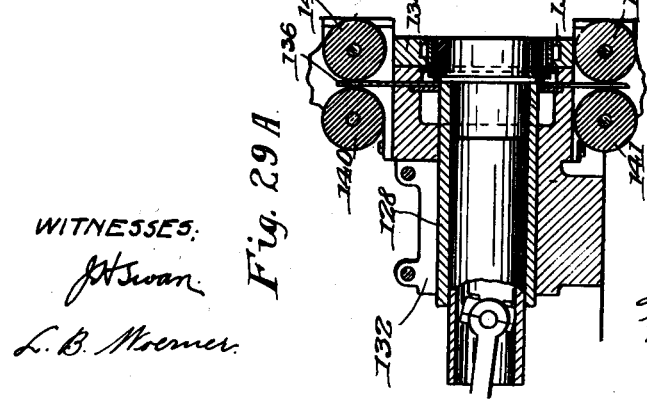

H. D. CAYLOR & W. A. SCOTT.
PAPER BOTTLE BOTTOMING MACHINE.
APPLICATION FILED NOV. 9, 1912.
1,164,921.
Patented Dec. 21, 1915.
16 SHEETS—SHEET 15.
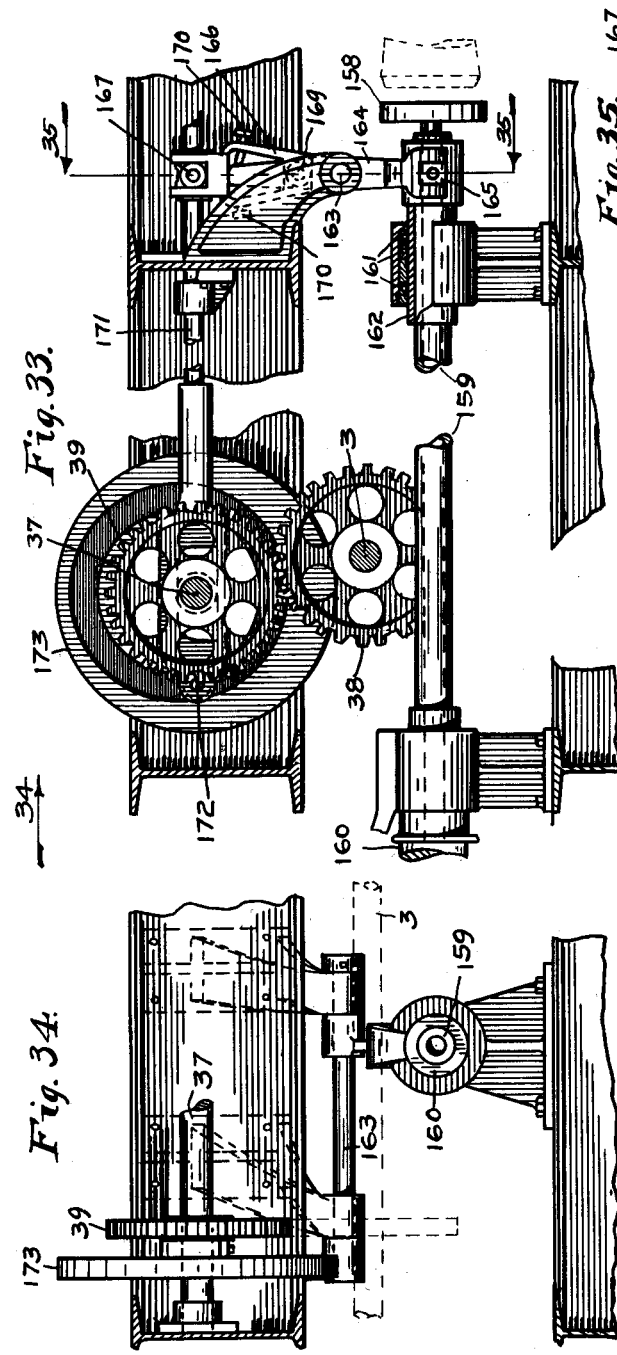
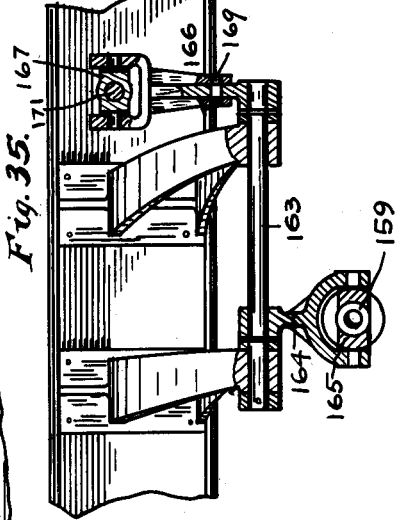
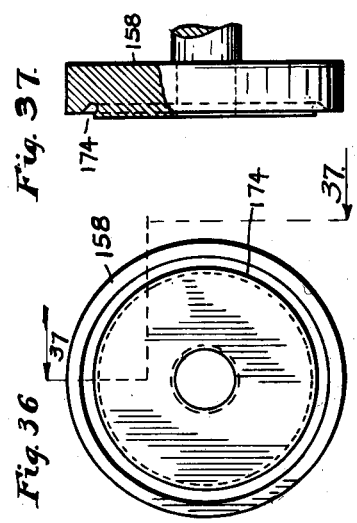
INVENTORS
Harry D. Caylor,
William Allison Scott.
By Minturn & Woerner
ATTORNEYS.
WITNESSES:
J H Swan
L. B. Woerner.

H. D. CAYLOR & W. A. SCOTT.
PAPER BOTTLE BOTTOMING MACHINE.
APPLICATION FILED NOV. 9, 1912.
1,164,921.
Patented Dec. 21, 1915.
16 SHEETS—SHEET 16.
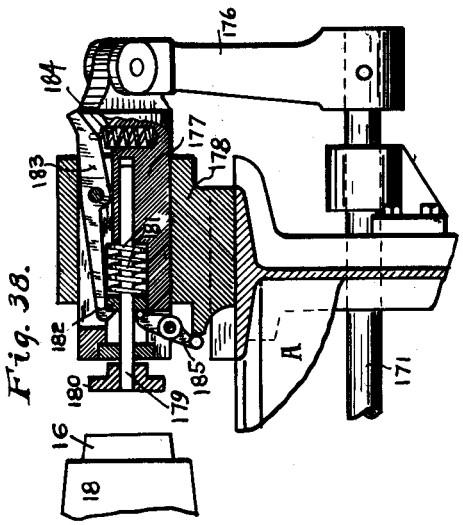
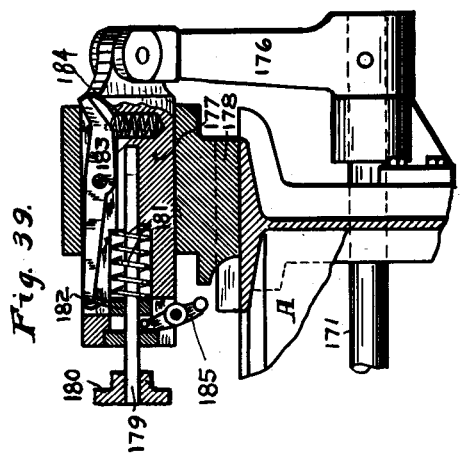
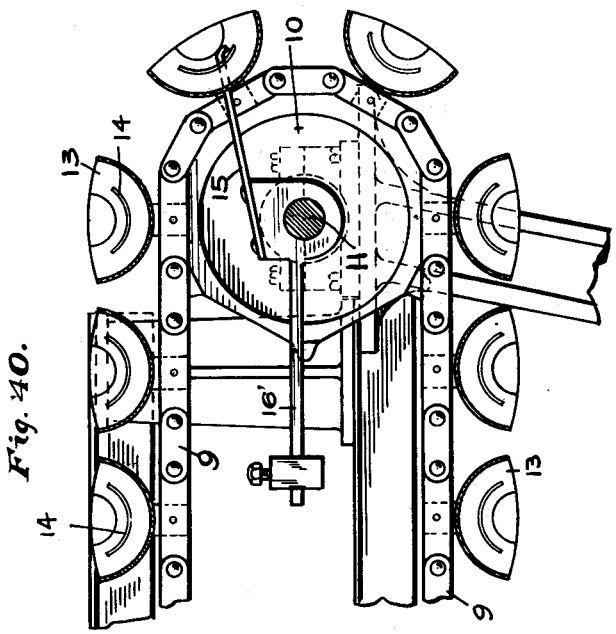
WITNESSES:
INVENTORS
Harry D. Caylor, and
William Allison Scott.
BY Minturn & Woermer,
ATTORNEYS

UNITED STATES PATENT OFFICE.

HARRY D. CAYLOR AND WILLIAM ALLISON SCOTT, OF INDIANAPOLIS, INDIANA, ASSIGNORS TO NATIONAL CONING MACHINERY COMPANY, OF INDIANAPOLIS, INDIANA, A CORPORATION OF INDIANA.

PAPER-BOTTLE-BOTTOMING MACHINE.

1,164,921.   Specification of Letters Patent.   Patented Dec. 21, 1915.

Application filed November 9, 1912. Serial No. 730,353.

*To all whom it may concern:*

Be it known that we, HARRY D. CAYLOR and WILLIAM ALLISON SCOTT, citizens of the United States, residing at Indianapolis, in the county of Marion and State of Indiana, have invented certain new and useful Improvements in Paper-Bottle-Bottoming Machines, of which the following is a specification.

This invention relates to machines for making paper bottles, and the object of the invention is to provide automatic mechanism which will cut the blanks for the bottoms of the bottles, form the bottoms of the desired size with downwardly projecting marginal flanges, coat the inner wall of the bottle with glue where the bottom is to be secured, insert the flanged bottom and turn the lower edges of the sides of the bottle in around the flange of the bottom.

Another object of the invention is to provide means for rendering the mechanism inoperative when the machine for any reason fails to present the proper incomplete bottle to any of the bottom forming and affixing devices of the machine.

The object of the invention also is to provide a machine which will automatically feed the bottle sides to the various bottom forming and affixing devices; which will form and affix the bottoms and then discharge the bottle with the bottom completed; and to provide such a machine which will automatically repeat these operations continuously.

The objects of the invention are accomplished by the mechanism illustrated in the accompanying drawings, in which—

Figure 2:
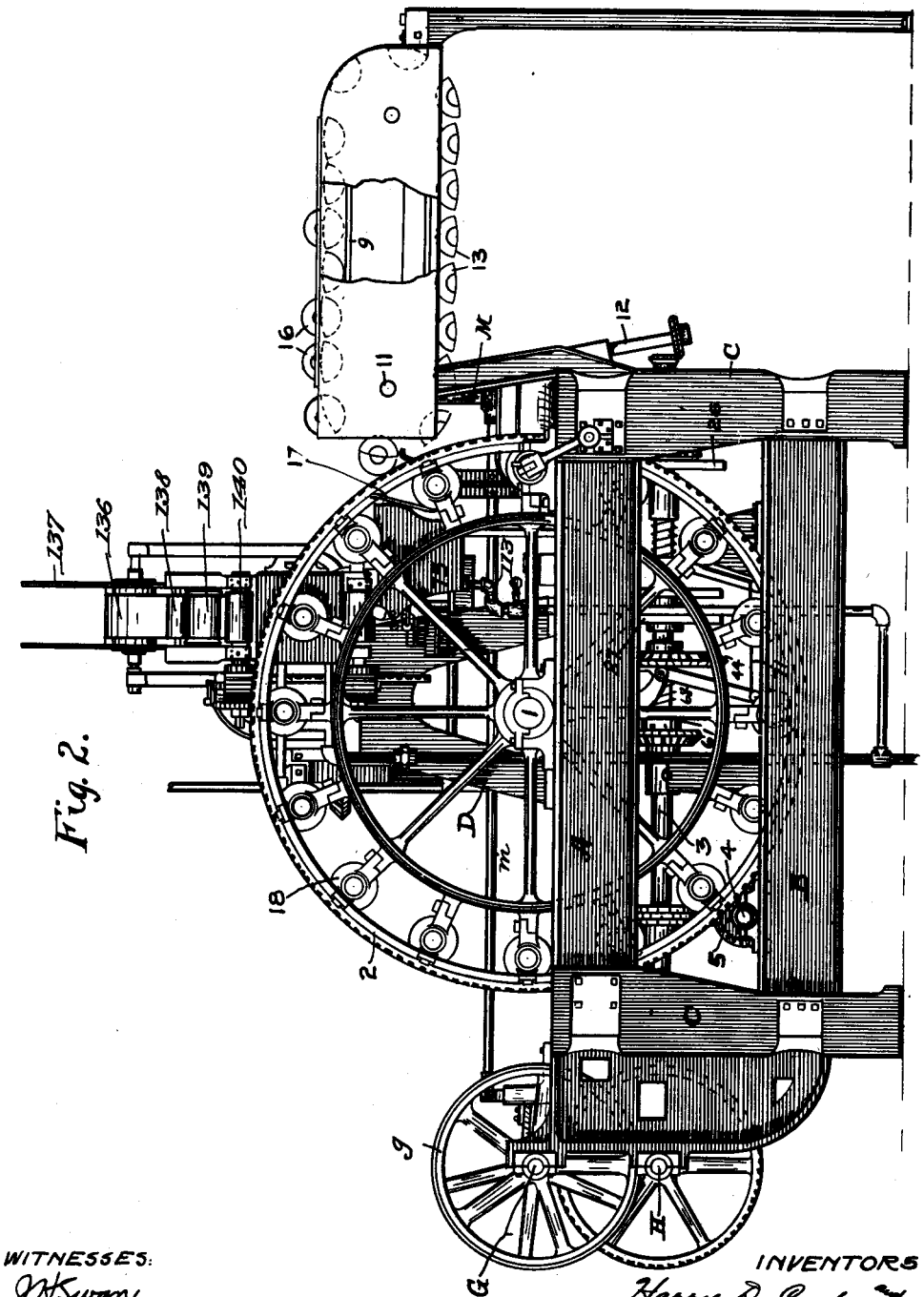
Figure 3:
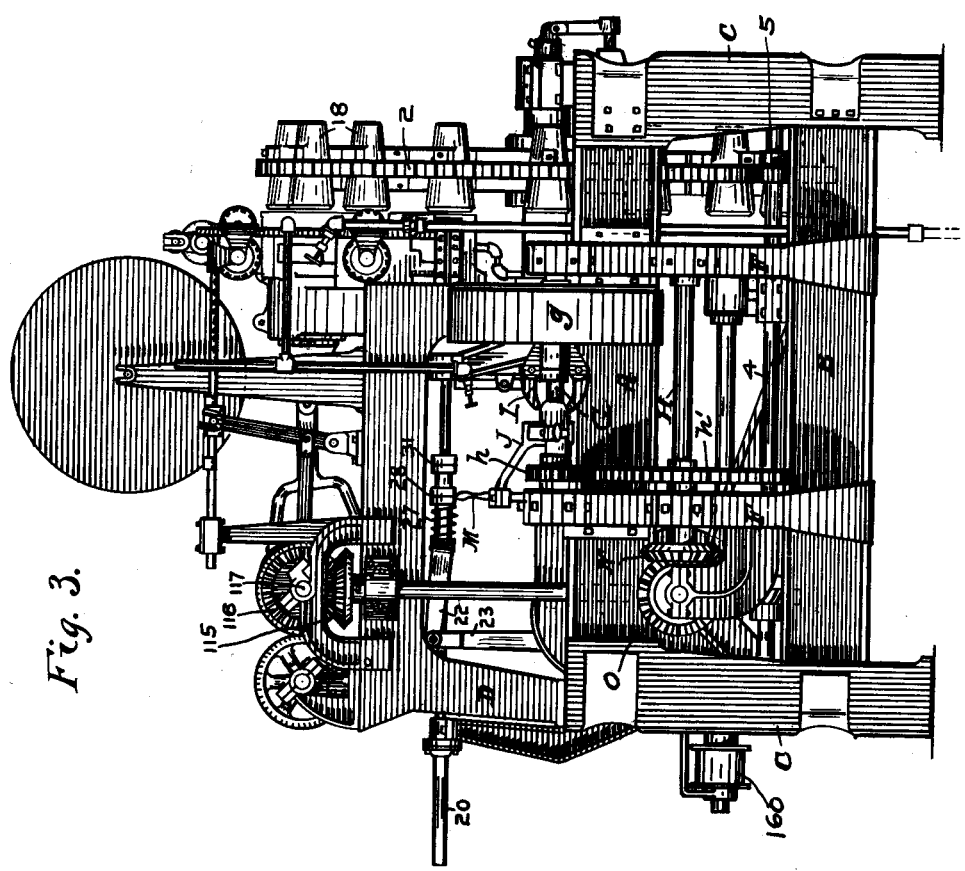
Figure 4:
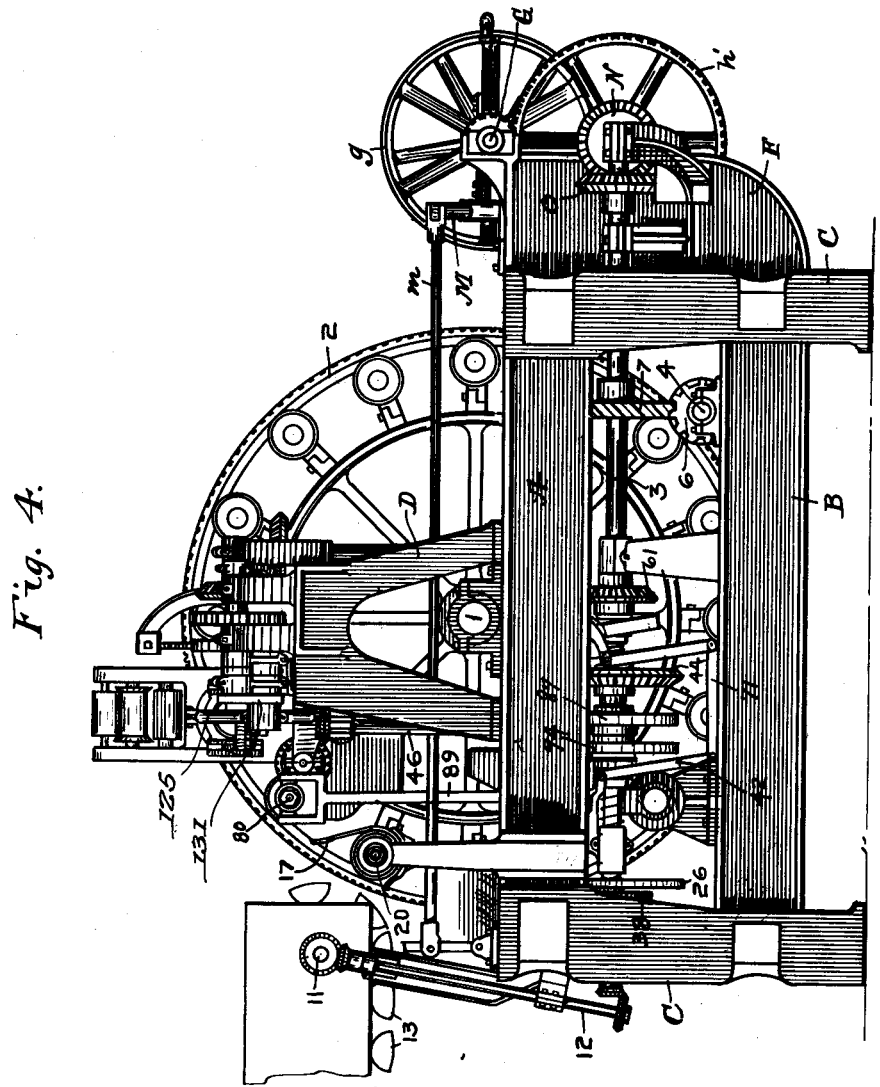
Figure 8:
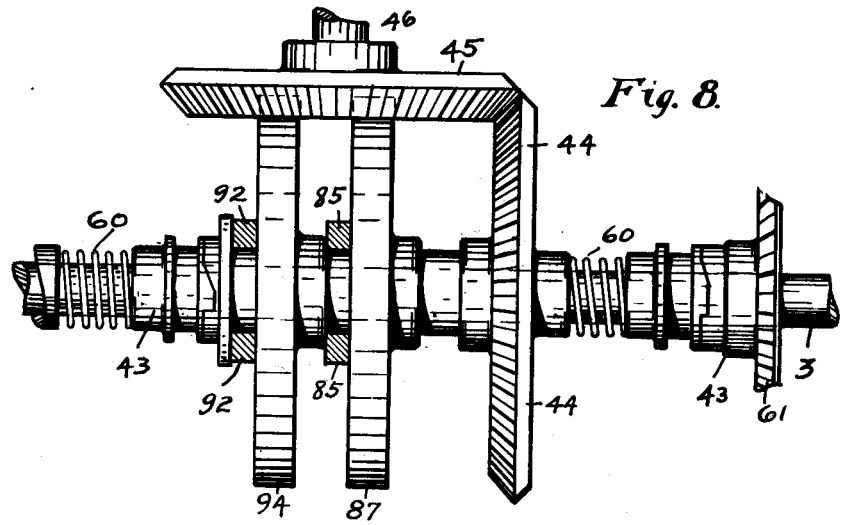
Figure 9:
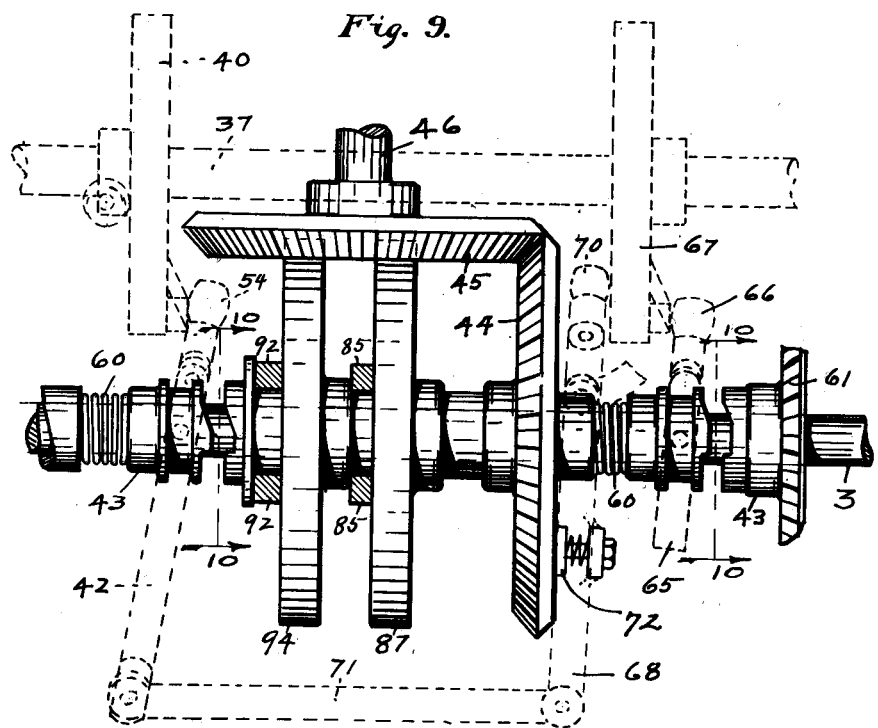
Figure 14:
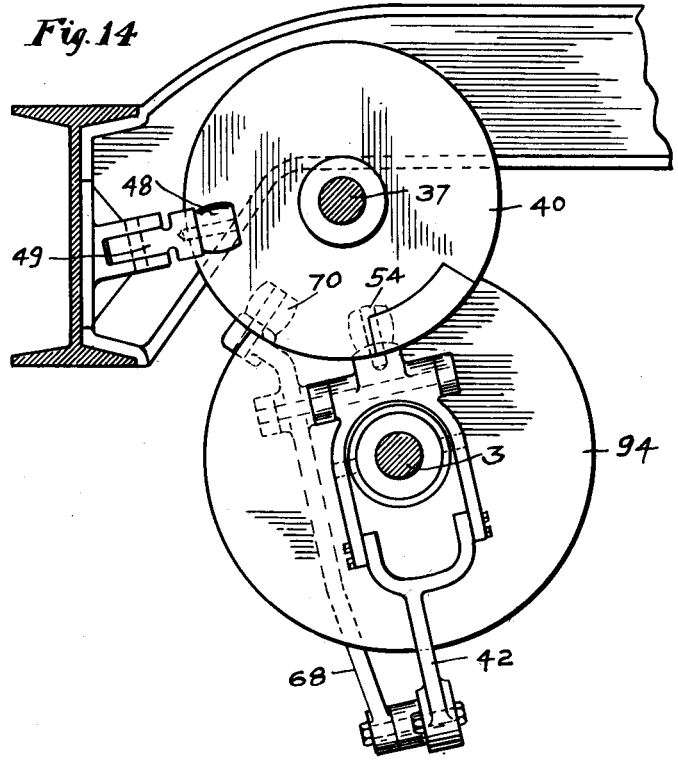
Figure 15:
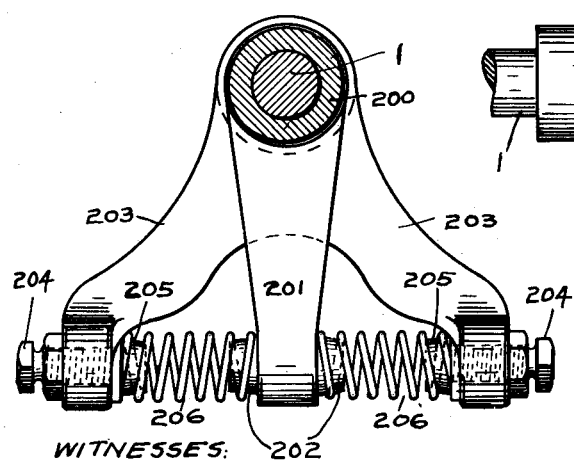
Figure 16:
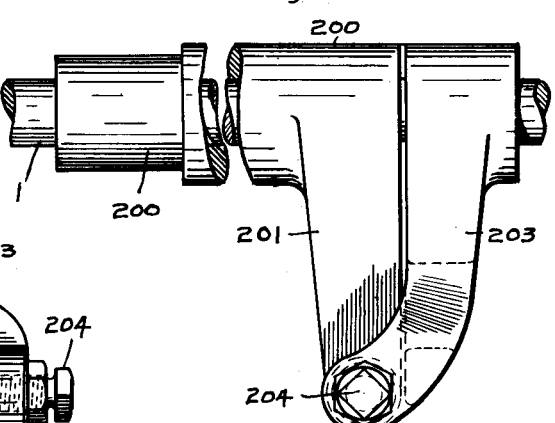
Figure 25:
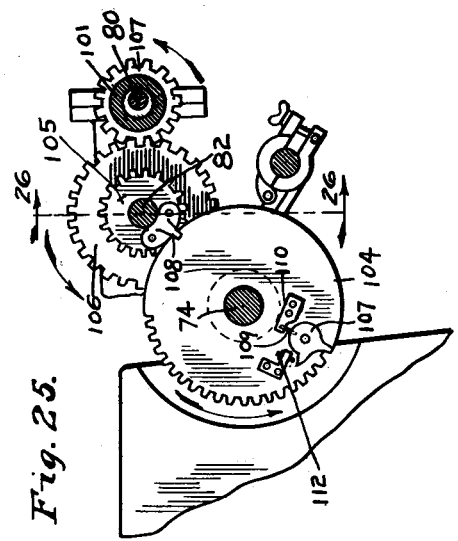
Figure 28:
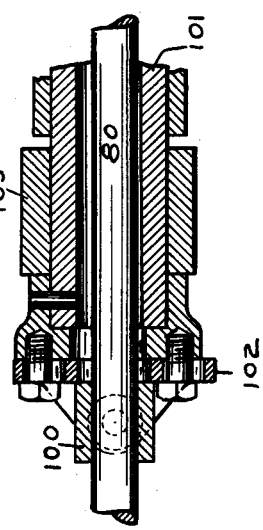
Figure 26:
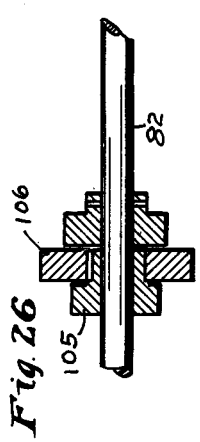
Figure 27:
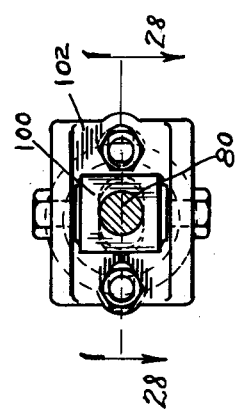

Figure 1 is a top plan view of the complete machine. Fig. 2 is a view in side elevation of the left side of the machine. Fig. 3 is a rear end elevation. Fig. 4 is a right side elevation. Fig. 5 is a front elevation. Fig. 5ª is a fragment, on a larger scale, of the sun and planet gear shown in Fig. 5. Fig. 6 is a detail in vertical section on the line 6—6 of Fig. 1, showing the driving connections of the various parts of the machine with the main shaft. The mechanism of Fig. 6 is shown on a smaller scale in Fig. 4. Fig. 7 is a top plan view of the mechanism shown in Fig. 6. Fig. 8 is a detail in side elevation of the main driving shaft, and clutch coupling for connecting therewith the mechanism for seating the conical bottle sides in pockets in a rotary carrier wheel preparatory to the formation and attachment to the sides of the bottle-bottoms, the view being on a larger scale than is shown in Fig. 6. Fig. 9 is a like view of the same parts with the clutch open and showing the clutch operating cams and levers in dotted lines. Fig. 10 is a cross section of the main driving shaft on the line 10—10 of Fig. 9, looking into the fixed half of the clutch. Fig. 11 is a vertical section on the line 11—11 of Fig. 6, on a larger scale, showing the cone-seating mechanism. Fig. 12 is a side view of the mechanism shown in Fig. 11. Fig. 13 is a section on the line 13—13 of Fig. 11. Fig. 14 is a fragment in vertical section on the line 14—14 of Fig. 6, additionally illustrating the cone-seating mechanism. Fig. 15 is a vertical section on the line 15—15 of Fig. 1, illustrating on a larger scale the shock absorber on the counter-shaft through which power is transmitted from the main shaft to the large cone carrying wheel. Fig. 16 is a side view of the mechanism shown in Fig. 15. Fig. 17 is a fragment of the upper part of the cone-seating mechanism, looking from the line 17—17 of Figs. 1 and 7. Fig. 18 is a plan view of Fig. 17, and Fig. 19 is a section thereof on the line 19—19 of Fig. 17. Fig. 20 is a fragment in vertical section on the line 17—17 of Fig. 1, on a larger scale, looking in the opposite direction from that indicated by the arrows, and showing the mechanism for applying glue to the inner walls of the cones, the gluing wheel being in the position to take a supply of glue preparatory to entering a cone. Fig. 20ª is a transverse section of the yoke-stem shown in Fig. 20, illustrating the universal joint at the end of the stem. Fig. 21 is a section on the line 21—21 of Fig. 6, showing the cam-wheel for raising and lowering the glue-wheel out and in the glue pot. This cam is shown in dotted lines in Fig. 20. Fig. 22 is a plan view of the glue supplying mechanism which is illustrated in Fig. 20. Fig. 23 is a view of the outer end (next the cone) of the mechanism for operating the glue-wheel. Fig. 24 is a fragment in vertical section on the line 24—24 of Fig. 22, showing the intermittent gears and shock absorber operating the glue-wheel. Fig. 25 is a fragment in vertical section on the line 25—25 of Fig. 22 of the gears for imparting a planetary movement to the glue-wheel. Fig. 26 is a section on the line 26—26 of Fig. 25. Fig. 27 is an end view of the auxiliary glue-shaft pivot bearing. Fig. 28 is a longitudinal section on the line 28—28 of Fig. 27. Fig. 29 is an elevation on a larger scale of the mechanism shown in Fig. 3 for punching blanks from which the bottoms of the bottles are to be formed, and for flanging the blanks and depositing them in place in the bottles. Fig. 29A is a fragment in vertical longitudinal section of the blank and bottom forming and placing punch and follower taken on the line 29A of Fig. 1. Fig. 30 is a section on the line 30—30 of Fig. 29. Fig. 31 is a view on a larger scale of the paper feeding mechanism opposite the arrow 31 of Fig. 29. Fig. 32 is a section on the line 32—32 of Fig. 31. Fig. 33 is a vertical section on the line 33—33 of Fig. 1, showing the mechanism for spinning the bottom of the cone inwardly under the flange of the bottle-bottom. This view shows the mechanism on a larger scale than same is shown in Fig. 1. Fig. 34 is an end view looking in the direction of the arrow 34 of Fig. 33. Fig. 35 is a vertical section on the line 35—35 of Fig. 33. Fig. 36 is a view in front elevation of the spinner wheel shown in Fig. 33, and Fig. 37 is a section on the line 37—37 of Fig. 36. Fig. 38 is a vertical section on the line 38—38 of Fig. 1, showing the bottle discharging device in its set position ready to discharge, and Fig. 39 shows the same device after it has been discharged and before it is reset, and Fig. 40 is a vertical section on the line 40—40 of Fig. 1, illustrating the carrier for conveying cones to and for positively discharging them into the machine.

Like characters of reference indicate like parts throughout the several views of the drawings.

The main frame-work of the machine comprises a pair of approximately square I-beam frames A and B supported one below the other, as shown, by legs C at each of the four corners. Mounted upon the frame A on standards D is a table E. The standards D and table E carry parts of the operative mechanism of the machine, as will be pointed out in detail hereafter.

Mounted in suitable journals upon the frame A is a shaft 1 extending transversely of the machine, and mounted on shaft 1 within the frame A and adjacent its left side is a large cone-carrying wheel 2, having an annular series of truncated conical holders, here shown as 16 in number, each of which is adapted to receive an incomplete truncated conical bottle, the bottom for which is to be punched out of paper by this machine, formed with an annular depending flange, inserted with glue to retain it, in the unfinished conical bottle and the edges of the bottle turned inwardly around the flange of the newly inserted bottom.

Supported at the rear of the machine by suitable brackets F is a transverse shaft G on which a pulley g is mounted, and to which power from any suitable source is delivered by means of a belt (not shown). Mounted on the shaft G is a pinion h, and between the latter and the pulley g is a friction-clutch I, operated by a bell-crank lever J pivoted to an extension from bracket F. One arm of the lever J is extended to the rear to form the hand-lever j and the other arm of the bell-crank lever is connected with a hand-lever M at the opposite or front side of the machine by means of a connecting-rod m. By this means the operation of the machine may be stopped from either front or rear.

Supported by brackets F below the shaft G is a shaft H parallel with the shaft G, and mounted thereon is a large spur gear wheel h' which meshes with the pinion h. The lower shaft H has a bevel-wheel N which meshes with the corresponding wheel O mounted on a shaft 3 extending longitudinally of the machine. The shaft 3 is the one from which the several devices for performing the successive operations here contemplated, are driven, and will hereafter be referred to as the main driving shaft.

Supported in journals which are carried by the lower frame B is a counter-shaft 4. This shaft 4 is intermittently driven from the shaft 3 by mechanism hereinafter to be described, and it is drivingly connected with the cone-carrying wheel 2 by means of a pinion 5 which engages with suitably formed teeth in the periphery of the wheel 2.

Mounted on the shaft 4 under the shaft 3 is a toothed-wheel 6, and mounted on the shaft 3, above it, is a wheel 7 having worm-teeth around a portion of its periphery to drivingly engage the teeth on the wheel 6, and having a channel 8 extending around the remainder or untoothed periphery of said wheel into which the tooth of the wheel 6 which is in mesh when it is reached by the channel 8 enters thereby arresting the travel of wheel 6 and of shaft 4 until the worm at the other end of the groove is reached, and thereupon the driving of the wheel 6 will be resumed. This provides the intermittent drive for the cone-carrying wheel 2 which is necessary to insure the pauses of the latter opposite the mechanisms for performing the various steps in making and supplying the conical sides of the bottle with a bottom.

The first operation is the supplying of the truncated conical paper sides, to the machine, to be bottomed. This is done by means of an endless conveyer which is illustrated in Figs. 1, 2, 4 and 40, and comprises a link carrier 9 (see Fig. 40) passing around a pair of wheels 10, with suitably shaped peripheries, suitably supported, as shown, and arranged to discharge the cones in series by gravity opposite the inner side of the wheel 2, as shown in Fig. 1, at a level between the axis of wheel 2 and its top periphery, as seen in Figs. 2 and 4. The shaft 11 on which the inner wheel 10 is mounted has a bevel-wheel (see Fig. 4) which meshes with a pinion on a shaft 12, and the latter is drivingly connected in a similar manner with the main driving shaft 3.

Suitable ones of the links of the carrier 9 are provided with curved cone holders 13, in each one of the upper row of which, a paper cone to be bottomed is placed. The inner wall of each of these carriers is provided with a transverse slot 14 to permit the entrance of the curved end of a discharge rod 15 at the point of travel where the cones are to be discharged. The purpose of the rod 15 is to unseat and positively discharge the paper cone from its carrier. The rod 15 is mounted on a block which is swingingly mounted on the shaft 11 whereby the rod 15 may move a limited distance with the cone carrier 13. A weighted arm 16' secured to the opposite side of the block will return the block and arm 15 to a normal position.

As each truncated conical bottle side 16 is dropped from the carrier 9 it is caught by a receptacle 17, here shown as formed from sheet-metal, bent as shown in end view in Fig. 2. This receptacle 17 is opposite one of the truncated conical holders 18 of the wheel 2. The next operation is to seat the paper bottle sides 16 in the adjacent receptacle 18. This is accomplished by a reciprocating seating-plunger or head 19, mounted on a plunger-rod 20 supported from the frame A by standards 21 (see Fig. 17). The rod 20 is connected by a yoke 22 with a lever 23 pivoted at 24 to a bracket 25 from the frame A. The lower end of the lever 23 terminates with a pin which enters a cam-shaft in the wheel 26 on the shaft 3. This construction imparts a reciprocatory movement to the rod 20 and head 19, and by the contact of the latter with the cone in the receptacle 17 the cone will be pushed small-end-first into the receptacle 18 of the wheel 2. As the cones are frequently made out of paper of different thicknesses, there will be a corresponding variation of distance into the receptacle 18 to which the cones must be forced to secure a tight fit, and this necessitates an adjustment of the point of attachment of the yoke 22 to the shaft 20. It is also desirable to provide automatic means for discontinuing the gluing and bottom supplying operations should any failure occur in the supply of the cones 16 the receptacle 17. We therefore provide a spirally wound spring 27, which is wrapped around the rod 20 between the yoke 22 and a pair of lock-nuts 28. We preferably slip a threaded sleeve 29 upon the rod 20, securing it to the rod by any suitable means, and on this sleeve we provide the lock-nuts 28 and also the lock-nuts 30, on the opposite side of the cross-head of the yoke from the nuts 28. By adjusting the position of the lock-nuts 28 and 30 the longitudinal movement of the rod 20 may be varied. The cross-head of the yoke has a sliding fit on the rod 20.

Mounted on the sleeve 29 between the lock-nuts 28 and the head 19 is a pair of lock-nuts 31, which nuts are adapted to contact with a lever 32 only on occasion when, the cause of the absence of a cone 16 to be seated, the rod 20 is permitted to travel enough farther to bring the nuts 31 into operative contact with the lever. The lever 32 is pivoted at 33, as shown in Fig. 17, and its lower end is connected by a link 34 with a longitudinally movable dog 35. The dog is normally held in its inner or housed position by the action of a spring 36, and is forced out by contact of the nuts 31 with the lever 32.

Mounted above and parallel with the main shaft 3, is a shaft 37 which is driven from shaft 3 by the gears 38 and 39. Mounted on the shaft 37 is a cone-seating trip-disk 40 (see Figs. 6, 7, 11, 12 and 13) having a lever 41 pivoted in its periphery and adapted to be swung from a projecting position on the side of the disk adjacent to the dog 35, to a projecting position on the other side of the disk, where it will contact with a clutch-lever 42, and uncouple its clutch-half from a clutch-half on the end of a long sleeve 43 mounted on the shaft 3. Mounted on the other end of the sleeve 43 is a bevel cog-wheel 44 which meshes with a like wheel 45 on a vertical shaft 46 through which power to operate the gluing device is transmitted. Consequently, when the sleeve 43 is uncoupled by a throw of the lever 42, the gluing device will become inoperative.

The lever 41 in the periphery of disk 40 is projected normally toward the dog 35 by a spring 47, and rolling against that side of the disk 40 is a roller 48 on the end of a lever 49, which lever is pivoted at its opposite end to the frame of the machine. This lever 49 has a projecting arm 50 which is pressed by a spring 51 to hold the roller 48 in contact with the side of the disk except when forced away at each revolution of the disk by the projecting lever 41. But when the dog 35 is projected by the contact of nuts 31 against the lever 32, as previously described, it enters the path of the arm 50 of lever 49, thereby forcing the lever 41 to the other side of the disk where it will be locked by the engagement of a spring-catch 52, carried by the lever 41 in a detent on the body of the disk. The detent will preferably be made in a plate of hardened steel 53, set into the disk, to insure longer wear. The lever 41, thus projected by the action of the dog 35, in advance of the roller 54 on the clutch-lever 42, is in position to shift the lever 42 and open the clutch coupling when the projection reaches the said roller 54.

The clutch-coupling is of a peculiar construction, illustrated in Fig. 10, wherein a single lug 55 will make coupling engagement at only one point during a complete revolution of the shaft 3, thus keeping the sleeve 43 uncoupled for a determinate period which is timed to correspond with the movement of the wheel 2 one-sixteenth of a complete revolution, or from one cone station to the next. The clutch-half moved by lever 42 is pressed by a spring 60 into coupling contact with its mate so as to complete the coupling operation when the shape of the parts will permit.

After each uncoupling operation, above described, the lever 41 is released by withdrawing its spring-catch 52 from its holding detent, and thereupon the lever is moved to a projecting position on the other side of the disk by a spring 47. The release of the catch 52 is by the action of a wedge 57 against a pin 58 carried by the catch. The wedge 57 is pivoted to the underside of a lever 59, which in turn is pivoted to the lever 41. The free end of the lever 59 projects laterally of the lever 41 as shown in Fig. 12, whereby the roller 54, by contact with said projection, will swing the lever 59 inwardly and lower the wedge 57 against the pin 58, moving the catch in opposition to its spring and out of said detent.

By the above described means the glue applying mechanism will become inoperative whenever, and only when, there is no paper cone 16 supplied to the receptacle 17 to be pushed into the receptacle 18 of the wheel 2. The absence of a cone allows the plunger and its rod 20 to travel farther than when a cone is there to be seated, and such further travel throws the lever 32 by pressure from the nuts 31.

The glue applying mechanism will hereinafter be fully described, as will also the bottom-punching, forming, and affixing mechanisms which follow in regular order, but, inasmuch as all of these should be inoperative whenever there is a failure to present a cone 16 to be bottomed, we will proceed now to describe the mechanism for rendering the bottom-forming and affixing mechanism also inoperative. This mechanism is driven from the shaft 3 on which the bevel-wheel 61 is loosely mounted, and drivingly engages with a corresponding wheel 62 on a vertical shaft 63 which transmits power to the bottom-punching and affixing mechanism. The hub of wheel 61 is formed with a half-clutch to engage with a half-clutch 64 splined on the shaft 63, causing the half-clutch to rotate with the shaft but permitting it to be moved longitudinally of the shaft. This longitudinal adjustment to open and close the clutch-coupling, is accomplished by a yoke-lever 65.

The yoke-lever 65 has a roller 66 on its upper end which normally bears against the side of a disk 67, similar to the disk 40, mounted like the disk 40, on the shaft 37. A lever 68 is pivoted to an arm 69 supported from the frame A and carries a roller 70 at its upper end. The opposite or lower end of the lever 70 is extended, as shown in Fig. 6, and is connected by a link 71 with the lower extended end of the lever 42. The levers 42 and 68 thus have a simultaneous parallel movement. The disk 67 has a swinging lever 41 and connected mechanism like that described for the disk 40 except that it is in reverse order, and the lever 41 is adapted to project, by the action of the spring 47 normally toward the roller 70; but it will not contact with the roller 70 except when the latter is thrown into its path by the movement of the lever 42, which lever 42 has previously been set in motion by the mechanism heretofore described, through the absence of a paper cone 16 in the receptacle 17.

In practice the disks 40 and 67 are set so the lever 41 of the disk 67 will be operated about 370° later than the lever 41 of the disk 40, in order that a cone in advance of a coming vacancy may be supplied with a bottom, although the glue supplying operation is interrupted where the vacancy occurs. To keep the gluing mechanism from getting out of time with the bottom-punching and affixing mechanism while being uncoupled, we provide a brake-shoe 72 on a rod carried by the lever 68, which contacts with the wheel 44 when the lever is thrown to open the couplings. A spring on the rod gives the shoe a yielding pressure. The lever 42 is slotted longitudinally for the attachment of the link 71 to allow for adjustment to regulate the throw of roller 70 on the upper end of the lever 68.

We will now describe the mechanism for applying glue to the inside of the paper cone 16, preparatory to the introduction of the bottom of the bottle. Power to drive this mechanism is transmitted through shaft 46 to the horizontal shaft 74 (see Fig. 20) from shaft 3 (see Fig. 4) through the automatic trip mechanism previously described. 75 is a glue-pot from which a disk 76 is supplied with glue, after which the disk 76 moves outwardly into a cone 16. The disk is smaller in diameter than that portion of the cone to be glued, and it is gyrated without rotation on its own axis, within the cone. To effectually accomplish the purpose the glue wheel is required to enter the cone 16 sufficiently remote from the cone wall to keep the latter from becoming smeared with glue. The disk is then moved into contact with the cone wall and is moved without rotation on its own axis twice around the interior of the cone to insure a thorough application of the glue. It is then moved up radially of the cone to free it from contact with the cone wall and it is then withdrawn to a position above the glue-pot and then lowered into the glue-pot to be recharged for a repetition of the above operations.

Located within the glue-pot is a glue charging wheel 77, (see Fig. 23) the lower portion of which is submerged in liquid glue in the bottom of the pot, kept in that condition by steam, the excess of glue being removed by a scraper 78. The disk 76 is lowered into contact with the wheel 77 and obtains its supply of glue from the latter (see Fig. 23) by being rotated on its own axis against the periphery of the rotating wheel 77. The disk 76 moves through a slot in the end of a scraper-plate 79, which scraper removes the glue from the sides but not from the periphery of the disk. The lower end of the plate 79 is bent into trough form as shown in Figs. 22 and 23 and this trough drains the glue back into the pot.

The above-mentioned lowering of the disk 76 to take glue, and the raising of it into position to enter a cone 16, is accomplished by mounting the disk on a shaft 80 and by supporting the bearings of the shaft 80 on lever-arms 81, which are pivoted on a shaft 82, parallel with, and between the shafts 74 and 80. A swinging movement of the arms 81 around the shaft 82 to raise and lower the shaft 80 and its disk 76 is secured by a yoke 83 which is connected with a bell-crank lever 84 (see Fig. 20) supported by the machine frame. A universal joint connection between the yoke 83 and the upper arm of the bell-crank lever 84 as shown in dotted lines in Fig. 20 and in the top plan view of Fig. 20ᵃ is necessary to permit the yoke 83 to move with levers 81 without binding. The lower arm of the bell-crank lever 84 is connected with the bar 85 which bar has a yoke at its opposite end through which the shaft 3 passes to keep this end of the bar from dropping down, and the bar itself carries a pin 86 which enters a cam-groove in the side of wheel 87 (see Fig. 21). The pin has a friction-roller as shown by dotted lines.

The shaft 80, which carries the glue-disk 76, is reciprocated longitudinally to cause the disk to move in and out of the cone 16. To accomplish this, the shaft is provided with the parallel fixed plates 88, between which pins carried by the bifurcated end of a lever 89 are interposed. Each of these pins has a friction-roller 90 (see Figs. 20 and 22). The lever 89 is pivoted at 91 to the frame of the machine, and its lower end is longitudinally slotted to receive the pivot of a bar 92. The bar 92 is bifurcated to straddle the shaft 3 and guide that end of the bar, and it carries a pin 93 which enters a cam-groove in the side of wheel 94 (see Fig. 20).

The shaft 80 is required to be rotated intermittently, that is, it rotates while the disk 76 is being replenished with glue from the wheel 77, and it ceases to rotate thereafter, and while in the paper cone 16. This intermittent drive is secured through an incomplete gear-wheel 95, mounted on the shaft 74, meshing with a mutilated pinion 96, on the shaft 82, and the intermittent movement on the shaft 82 is transmitted through the spur gear wheel 97 on the shaft 82, and its pinion 98 on the shaft 80. This mechanism is so timed that the disk 76 rotates only while it is in contact with the glue replenishing wheel 77.

To impart the required gyratory travel to the shaft 80 and its disk 76 while in the cone 16, we mount it in a pair of journals 100, which are bolted to opposite sides (see Figs. 22, 27 and 28) of a cylindrical sleeve 101, or rather to plates 102 which are bolted to the ends of the sleeve, the plates being slotted diametrically of the sleeve, as shown by dotted lines in Fig. 27, to allow for the adjustment of the boxes eccentrically of plates 102, as may be required when the glue is to be applied at different distances from the end of the cone 16. The sleeve 101 is mounted in journal-boxes 103 carried by the levers 81, and it is rotated intermittently through the incomplete gear 104 on shaft 74, its mutilated pinion 105 on the shaft 82, the spur gear 106 integral with the mutilated pinion 105, and the pinion 107 on the sleeve 101. The bore of the sleeve 101 is ample to allow the shaft 80 to gyrate in it without interference.

A timing device between the gears 104 and 105 (also between the gears 95 and 96) is provided (see Figs. 24 and 25) to cause their teeth to engage properly at the beginning of each drive, and to reduce the strain and shock at those moments. This is accomplished by a lever 107 which is pivoted to the side of the gear 104 (or 95) and has an arm in the path of a lug 108 secured to and projecting from the side of the wheel 105 (or 96). The lever 107 is elastically held in position by a leaf-spring 109 which has one of its ends anchored in the lever and its other end anchored in a block 110, fastened to the side of the wheel 104. This elastic attachment permits the lever to give under an impact from the lug 108, on the wheel 105, within prescribed limits defined by a set-screw 112 in a block on the side of the wheel 104.

The operation of the above-described gluing device is as follows: Starting with the disk 76 in the position shown in Fig. 23 after it has been charged with glue, it is lifted to the position shown by dotted lines, by the cam-groove in the wheel 87, the mutilated gears 95 and 96 having previously stopped the rotation of the shaft 80. The disk 76 is then moved forward into a cone 16 positioned ready to receive it, by the action of the cam-groove in the wheel 94. Then the shaft 80 and the disk 76 are lowered by the shape of the cam-groove in the wheel 87 to contact the disk with the cone. Then the shaft is gyrated in the sleeve 101, causing the disk 76 to be correspondingly carried twice around against the inner wall of the cone 16 by virtue of the differences of the diameters of the two gears 107 and 108. Then, by the shape of the cam-groove in the wheel 87, the disk is lifted up from the wall of a cone 16, and it is withdrawn by the cam in the wheel 94 to a position above the glue supplying wheel 77, into contact with which it is lowered by the cam-groove in the wheel 87, and by the engagement then of the teeth of the gear 95 with those of the pinion 96 the disk is rotated against the wheel 77.

A suitable quantity of glue is maintained in the glue-pot 75 to adequately supply the wheel 77, and this is kept in a liquid condition by the agency of steam supplied through the pipes 113.

We will now describe the mechanism for punching, forming, and placing the paper bottoms in the glued cones. Power for operating this mechanism is transmitted by suitable gears from shaft 3, through shaft 63, to the bevel-wheel 115 on the upper end of shaft 63, and from the bevel-wheel 115 to the bevel-wheel 116 on a horizontal shaft 117. Mounted on the shaft 117 is a spur gear wheel 118 which meshes with a spur gear wheel 119 (see Figs. 1 and 30), on a hollow parallel shaft 120'. Mounted in the hollow shaft 120' is a stationary shaft 121, on the front end of which is a sun-wheel 122 (see Figs. 30 and 5ᵃ) of a planetary gear, the planet-wheel 123 operating with which, is mounted on a crank on the front projecting end of the hollow shaft 120'. The planet-wheel 123 carries an eccentric pin 124 (see Fig. 5ᵃ from which a pitman 125 is driven. The pitman 125 is pivotally connected with the rod of the flanging head 126 (see Fig. 29ᴬ).

The pitman 125 is split longitudinally of its major portion and is spread apart there to straddle the transmission which drives a hollow punch 128, which latter punches the paper blank for the bottle bottom. The punch 128 is hollow and the flanging head 126 reciprocates in and through it.

We find it expedient to use the above sun and planet transmission instead of a simple crank, because, by the eccentric attachment of the pitman to the planet-wheel we secure the variable speed for the flanging head, which, by being in its slow period while the paper is being fed, punched, and stripped, operates with accelerated speed to do its work of flanging and seating the bottom, after said preliminary operations have been completed by said associated mechanism. The construction also reduces the space required in which to operate, thereby producing a more compact machine.

The punch 128 is driven by a pitman 130 from a crank 131 (see Fig. 4) on the front end of the shaft 116. This pitman is bifurcated, as shown in Fig. 1, to allow the split pitman 125 of the flanging head to work between its bifurcated ends.

The punch 128 reciprocates in a suitable bore of a housing 132 into cutting contact with a die 133 adjustably mounted in a bolster-plate 134 bolted to the housing, as shown in Fig. 29ᴬ. The bore in the bolster-plate is large enough to permit of an adjustment of the die to bring it into register with the punch. The bolster-plate is recessed, as shown at 135, to receive steam by which the die is heated to heat the paper blank during the flanging operation and thereby enable the flange to be formed without breaking the fabric of the paper, and giving it an initial set which it retains when cooled, and also enabling the paper to be presented in a warm condition to the glue, thereby securing a better adhesion than if brought cold into contact with the glue.

The paper 136 from which the bottle bottoms are formed is fed from a roll 137 (see Fig. 2) supported above the punching mechanism. The paper is fed from the reel 137 under a tension roll 138 located over the die, thence over a roller 139 having inwardly beveled end flanges, the function of which flanges is to adjust the paper in perfect vertical alinement with the punch below. It passes from the roller 139 between a pair of feed-rolls 140, and is thence conducted down across the face of the punch to a pair of feed-rolls 141 below, which latter convey the scrap paper from the machine.

142 is a sheet-metal stripper-plate having a hole through which the punch 128 passes, and is to keep the punched paper from being carried back with the punch when the latter is withdrawn.

By the above-described mechanism the punch 128 first advances against the die and forms a circular bottom-blank out of the intervening paper and forces the blank the fraction of an inch into recess in the die. The flanging head 126 then advances while the punch is in said last position and forces the blank into a reduced diameter of the die, the inner corners of the latter being rounded, as shown in Fig. 29ᴬ, to cause the paper to bend and form a flange without being severed. By a further travel of the flanging head the newly formed bottom is forced out of the die into the end of a paper-cone 16 which is waiting to receive it. During all of this time, and also until the flanging head has almost withdrawn from the die, the punch has remained in the die, but during the remainder of the withdrawal of the flanging head and the punch the flanging head recedes more rapidly than the punch and its end passes the punching end of the punch.

Both pairs of feed-rolls 140 and 141 are positively driven by mechanism actuated from the shaft 116. Mounted on the shaft 116 is an eccentric, shown in dotted lines in Fig. 29, which is surrounded by a strap connecting it with a link 142' which link is connected with a lever 123. The lower end of the lever 143 is pivoted to the frame of the machine. Supported above the frame of the machine by an extension from housing 132 and by a standard 144 is a rack-bar 145 having under-side cogs to engage with the teeth of a cog-wheel 146 mounted loosely on the shaft of the main feed roll 140. A reciprocating travel is imparted to the bar 145 by the oscillatory movement of the lever 143. The upper end of the lever 143 is bifurcated, as shown in Fig. 29, to receive the roller-bearings on pins 147, which are projected laterally of the head 148 slidingly mounted on the bar 145. Tappets 149 and 150 are mounted on the bar to contact with the head and these tappets are made adjustable on the bar to permit regulation of the throw of the bar.

Mounted on the same shaft with wheel 146 is a ratchet wheel 152, which is pinned to the shaft as is shown in Fig. 32. A spring-pressed ratchet 153 is carried by the wheel 146 and engages the ratchet-wheel 152. Motion imparted to this shaft is transmitted by gears 154 and 155 to the shaft of the companion feed-roll 140.

The thickness of the wheel 146 is ample to accommodate the horizontal rack-bar 145, and also a vertical rack-bar 156. The rack-bar 156 transmits motion to a cog-wheel 157 (see Fig. 29) inserted loosely on the inner shaft on the lower pair of feed rolls 141. This wheel 157 is drivingly connected with its shaft by means of a ratchet and wheel (not shown) the same as is described and shown for the upper wheel 146.

The bottom is introduced far enough into the truncated cone 16 to allow the ends of the cone-wall to project about three-sixteenths of an inch beyond the flange of the bottom, and the next operation of the machine is to roll this projecting portion of the wall inwardly around the flange of the bottom of the bottle. In this operation the paper of the bottle is heated by a friction with a rapidly rotating disk so channeled that when the disk contacts with the cone it will form a half-round bead against the inner wall of the flange below the bottom of the bottle to stiffen and strengthen those parts and also to give the bottle a finished appearance at that end.

The rotating disk mentioned in the last paragraph, or spinner-wheel as it is called, shown at 158 (see Figs. 5, 33, 36 and 37) is mounted on a shaft 159 supported from the lower frame B. Mounted on the opposite end of the shaft 159 is a pulley 160 (see Figs. 3, 33 and 34) which has a belt-drive (not shown) separate from that which operates the rest of the machine. The pulley 160 is splined on the shaft 159 to permit longitudinal as well as rotary movement of the shaft. The shaft 159 will preferably be hollow to receive a tapering mandrel on which the spinner-wheel 158 is mounted, whereby the wheel 158 is readily removable for renewal purposes. The shaft is mounted in ball-bearings 161 (see Fig. 33) which permit rotary and longitudinal movement of the shaft, but prevent its lateral displacement, and a hardened steel bearing sleeve 162 will preferably be interposed between the balls and the shaft.

Mounted transversely above the inner end of the shaft 159 is a rock-shaft 163 having an arm 164, the lower end of which is bifurcated, and its arms are pivotally connected with a block 165 mounted on a thrust bearing on shaft 159. Mounted on the opposite end of the rock-shaft 163 is an arm 166, the upper end of which is bifurcated to receive a cross-head 167 having pins which bear in the bifurcated member. This lever is preferably in two parts pivotally united at 169, having the upper end of the lower member adjustable between a pair of setscrews 170 (see Fig. 33). This adjustment is to regulate the throw of the spinner-wheel 158 to suit varying lengths of bottles and is also to compensate for wear.

The cross-head 167 is mounted on a shaft 171, which is split, as shown by dotted lines in Fig. 33, to pass around and to be guided by the shaft 37, and the shaft 171 terminates with a pin 172 which operates in a cam groove in the side of the disk 173 mounted on the shaft 37. The shape of the cam-groove imparts intermittent longitudinal movement to the shaft 171 which movement is transmitted by the above described connecting mechanism to press the spinner-wheel 158 against the end of the bottle 16 to be beaded.

The beading of the bottle is accomplished by the groove 174 (see Figs. 36 and 37) formed in the outer side of the spinner-wheel 159. The shape of the groove in cross-section is shown in Fig. 37.

As shown in Fig. 35, the shaft 171 is located above and laterally of the spinner-shaft 159, and its longitudinal reciprocating movement is utilized to operate the mechanism for ejecting the now finished bottle, which, on account of being firmly seated in the wheel 2, requires the exertion of an appreciable force to dislodge and remove it. This is applied to the small end of the bottle which is toward the outside of the machine. This knock-out mechanism is illustrated in Figs. 1, 2, 3 and 5, and in enlarged details in Figs. 38 and 39. Referring particularly to Figs. 38 and 39, which illustrate the mechanism before and after a bottle ejecting operation, an arm 176 is mounted on an extension of the shaft 171 and its upper end is pivotally connected with the outer end of a cylindrical barrel 177. The barrel 177 is slidingly mounted in a journal box 178, supported by the frame A of the machine. Mounted in the barrel 177 is a shaft 179 on the outer end of which is a head 180 which contacts with the end of the bottle 16 by the inward travel of the barrel and then the bottle is thrown out by the force of a spring 181. The bore of the barrel is enlarged, as shown, to receive the spring 181 between the bottom of the bore and a disk 182 fastened to the shaft. Mounted in a longitudinal slot in the top of the barrel is a pawl-lever 183 having a hook at its inner end to engage the disk 182 and hold the shaft with its spring 181 under compression. A spring 184 seated in a socket in the barrel normally elevates the outer end of the pawl-lever 183, but, on the inner travel of the barrel, the lever, contacting with the top of the bearing box 178 is lowered, thereby releasing the disk 182. This occurs after the barrel has moved inwardly by the operation of arm 176, to contact the disk 180 with the end of the bottle. Then the lever 183 will release the disk 182 and the shaft 179 will move quickly, by the impulse of spring 181 and thereby discharge the bottle into a chute 190 (see Fig. 5). The chute 190 guides the bottle to any desirable place of discharge. If the disk 180 should strike the bottle by the direct impulse of the spring 181 before it has been brought into contact with the bottle there would be danger of the blow injuring the bottle by this impact.

The resetting of the shaft 179 against the tension of spring 181 is accomplished by lever 185 pivoted in a slot in the barrel. A lug 186 projects in the path of the downwardly projecting end of the lever 185 causing the upper end of said lever to swing into contact with the disk 182 pushing the latter against and compressing the spring. This compression of the spring is held by the spring-actuated pawl-lever 183. The knock-out mechanism is thus set ready to eject a bottle at the next inward move of the master-shaft 171.

On account of its size and weight the inertia of the cone-carrying wheel 2 would probably soon shear off the teeth on gears 6 and 7 by its frequent stops and starts, without means for absorbing the shocks. We therefore provide a shock-absorber (see Figs. 1, 6, 15 and 16) comprising a sleeve 200 which is loosely mounted on the shaft 4, and on which the wheel 6 is mounted. This sleeve has an arm 201 (see Figs. 15 and 16), terminating with two opposite spring-holding arms 202. Mounted in a fixed manner on the shaft 4, close to the arm 201, is a hub having a pair of spread arms 203, the lower ends of which are bent across the arm 201. Set-screws 204 having suitable lock-nuts pass from the outside through the ends of the arms into movable spring-holding bosses 205. Spirally wound springs 206 are held between the arm 201 and the arms 203 by the introduction into the ends of the coils of the bosses 202 and 205. Any desired tension on the springs is secured by means of the set-screws 204 and their lock-nuts.

In starting the wheel 2 the spring in front of the arm 201 will be compressed, and in stopping the wheel 2 the strain will be against the spring at the rear of the arm. A cushioning of the strain on the driving mechanism will result.

The operation of our machine has been described in detail in connection with the detailed description of the several parts of the machine, and therefore a further description of the operation is unnecessary.

While we have described our invention with more or less minuteness as regards details of construction and arrangement and as being embodied in certain precise forms, we do not desire to be limited thereto unduly, or any more than is pointed out in the claims. On the contrary we contemplate all proper changes in form, construction and arrangement, the omission of immaterial elements and the substitution of equivalents as circumstances may suggest or as necessity may render expedient.

We claim—

1. In a bottle bottoming machine, means comprising a gyrating wheel fixed on its own axis, the periphery of said wheel being coated with an adhesive agent, for applying an adhesive agent with a rotary wiping action in a circular direction to the sides of a bottle, and means for assembling a bottom and said bottle sides with the bottom in contact with said adhesive agent.

2. In a bottle bottoming machine, means comprising a gyrating wheel fixed on its own axis, the periphery of said wheel being coated with an adhesive agent, for applying an adhesive agent with a rotary wiping action in a circular direction to the sides of a bottle, means for forming a bottom, means for assembling said bottom and bottle sides with the bottom in contact with said adhesive agent, and means for presenting the bottle sides to said other means.

3. In a bottle bottoming machine, means comprising a gyrating wheel fixed on its own axis, the periphery of said wheel being coated with an adhesive agent, for applying an adhesive agent with a rotary wiping action in a circular direction to the sides of a bottle, means for forming a bottom, means for assembling said bottom and bottle sides with the bottom in contact with said adhesive agent, means for reinforcing the lower edges of the sides of the bottle.

4. In a bottle bottoming machine, means comprising a gyrating wheel fixed on its own axis, the periphery of said wheel being coated with an adhesive agent, for applying an adhesive agent with a rotary wiping action in a circular direction to the sides of a bottle, means for forming a bottom, means for assembling said bottom and bottle sides with the bottom in contact with said adhesive agent, means for reinforcing the lower edges of the sides of the bottle, means for presenting the bottle sides to said other means and means for automatically operating all of said means.

5. In a bottle bottoming machine, means comprising a shaft and a wheel mounted in a fixed manner on said shaft the periphery of said wheel being coated with an adhesive agent, said shaft having gyratory movement without rotation for applying an adhesive agent to the sides of a bottle, means for forming a bottom, means for assembling said bottom and bottle sides with the bottom in contact with said adhesive agent, means for reinforcing the lower edges of the sides of the bottle, a carrier to present the bottle sides to said other means, means to supply the bottle sides to the said carrier, and means to remove the bottomed bottle and means for automatically operating all of said means.

6. In a bottle bottoming machine, means comprising a shaft and a wheel mounted in a fixed manner on said shaft the periphery of said wheel being coated with an adhesive agent, said shaft having gyratory movement without rotation for applying an adhesive agent to the sides of a bottle, means for forming a bottom, means for assembling said bottom and said bottle sides with the bottom in contact with said adhesive agent, and a rotary carrier to present the bottle sides to the other means and means to render the operation of all of said means automatic.

7. In a bottle bottoming machine, means comprising a shaft and a wheel mounted in a fixed manner on said shaft the periphery of said wheel being coated with an adhesive agent, said shaft having gyratory movement without rotation for applying an adhesive agent to the inner sides of a paper bottle, means for forming a bottom out of paper, means for assembling said bottom and bottle sides with the bottom in contact with said adhesive agent, means for spinning a bead on the lower edges of the bottle sides, a carrier wheel having hollow holders, means to supply and seat bottle bodies in said holders and means to present the filled holders in proper sequence to said other means.

8. In a bottle bottoming machine, holders for bottle-sides, means for supplying bottle-sides to said holders, means comprising a shaft and a wheel mounted in a fixed manner on said shaft the periphery of said wheel being coated with an adhesive agent, said shaft having gyratory movement without rotation for applying glue to the inner sides of a paper bottle, means for punching a bottom out of paper forming it with a peripheral flange and introducing the flanged bottom into contact with the glue coated inner sides of the bottle, automatic means for operating said bottom punching, flanging and placing means in the order named, and means for presenting the bottle sides in said holders to said other means.

9. In a bottle bottoming machine, a rotary wheel having an annular series of bottle carrying receptacles, automatic means for supplying bottle sides to said wheel, automatic means for seating said bottle sides in said receptacles, means comprising a shaft and a wheel mounted in a fixed manner on said shaft the periphery of said wheel being coated with an adhesive agent, said shaft having gyratory movement without rotation for applying glue to the inner walls of said bottle sides, means for forming a paper bottom with peripheral flanges and for assembling said flanged bottom in contact with the glued bottle sides, automatic means for operating said bottom forming and assembling means, and means for discharging the bottomed bottles from the wheel.

10. In a bottle bottoming machine, a rotary wheel having an annular series of bottle carrying receptacles, automatic means for supplying bottle sides to said wheel, automatic means for seating said bottle sides in said receptacle, means comprising a shaft and a wheel mounted in a fixed manner on said shaft the periphery of said wheel being coated with an adhesive agent, said shaft having gyratory movement without rotation for applying glue to the inner walls of said bottle sides, means for punching a bottom bottle sides, means for punching a bottom from paper, means for forming peripheral flanges on said bottom, means for assembling said flanged bottom within the paper sides of a bottle in contact with its glue coated wall, automatic means for operating said last three means, means for forming a bead on the bottom of the bottle, and means for discharging the product from the rotary wheel.

11. In a bottle bottoming machine, a rotary wheel having a plurality of receptacles carrying bottles in the process of being bottomed, means for supplying bottle sides *seriatim* to said receptacles, means comprising a shaft and a wheel mounted in a fixed manner on said shaft the periphery of said wheel being coated with an adhesive agent, said shaft having gyratory movement without rotation for applying glue to the inner walls of said bottle sides, automatic means for forming and applying bottoms in said glued bottle sides, means for finishing the lower edge of the bottomed sides, means for discharging the finished product, all of said means operating at different stations, and means for intermittently moving the rotary wheel to present the bottle sides at said stations.

12. In a bottle bottoming machine, a rotary wheel having a plurality of receptacles in which bottles are carried in the process of being bottomed, means for supplying bottle sides *seriatim* to said receptacles, means comprising a shaft and a wheel mounted in a fixed manner on said shaft the periphery of said wheel being coated with an adhesive agent, said shaft having gyratory movement without rotation for applying glue in like manner to the inner walls of said bottle sides, automatic means in like manner for forming and applying bottoms to said glued sides, means in like manner for finishing the bottomed sides, means in like manner for discharging the finished product, all of said means operating at respective different stations, means for intermittently moving the rotary wheel between said stations, and means for reducing the shock at the starting and stopping of said wheel.

13. In a bottle bottoming machine, a carrier-wheel having a plurality of hollow holders to receive bottle-sides to be bottomed, a stationary hollow holder within which a bottle-side is loosely placed preparatory to introduction into a holder of said wheel, means for presenting the holders of the wheel *seriatim* to said stationary holder, and resilient reciprocating means for yieldingly pushing a bottle-side out of the stationary holder and for firmly seating it in a holder of the wheel.

14. In a bottle bottoming machine, a rotary wheel having bottle carrying receptacles, a holder to receive bottles, means for discharging bottles end first from the holder into the receptacles of the rotary wheel, an endless carrier supplying bottles to the holder, and means to positively discharge the bottles from the endless carrier to the holder.

15. In a bottle bottoming machine, an intermittently rotating bottle carrier, and comprising a shaft and a wheel mounted in a fixed manner on said shaft the periphery of said wheel being coated with an adhesive agent, said shaft having gyratory movement without rotation means for supplying glue to the inner walls of a bottle presented by said carrier, said glue supplying means comprising a circular disk the periphery of which is coated with glue, means for introducing the disk into the bottle, means for contacting it with the inner wall of a bottle, and means for imparting a gyratory travel to the disk without rotation on its own axis against the bottle walls to deposit glue on said walls by a sliding contact between the disk and bottle.

16. In a bottle bottoming machine, a device for applying glue to the inner walls of the bottle, comprising a glue-pot, a glue-wheel mounted therein, a disk adapted to rotate against the periphery of the glue-wheel, means for elevating the disk away from the glue-wheel, reciprocatory means for introducing the disk into a bottle cone to be glued, means for contacting the disk with the inner wall of the bottle cone, means for imparting a gyratory travel to the disk without rotation on its axis causing the disk to slide against the inner wall of the cone, means for moving the disk out of contact with the wall of the cone, and means for withdrawing the disk from the cone.

17. In a bottle bottoming machine, a bottle-cone carrying means, means for supplying glue by a wiping action in a circular direction to the interior of a cone, in combination with a bottom supplying means comprising means for punching a paper blank, means for forming peripheral flanges on said blank, means for depositing the flanged bottom within the cone in contact with its glue-coated surface and automatic means for operating said other means.

18. In a machine for forming paper bottoms for paper bottles, a bottom cutting and flanging die, a bottle-holder, rotary means for supporting and presenting the holder to the die, means for heating said die and means for feeding paper across the die to be cut and formed into bottoms, in combination with a hollow cutting punch, a flanging head reciprocating in and through the hollow punch and entering the bottle-holder and placing the bottom in a bottle in said holder and automatic means for operating said other means.

19. In a machine for forming paper bottoms for paper bottles, a bottom cutting and flanging die, in combination with a hollow cutting punch, a flanging head reciprocating in said hollow punch and means comprising a driving sun-wheel, a driven planet-wheel, an eccentric pin on the latter and a pitman for imparting a variable speed to the flanging head to cause it to move more slowly while the bottom is being punched and with accelerated speed in flanging and seating the bottom.

20. In a machine for forming paper bottoms for paper bottles, a bottom cutting and flanging die, a bottle-holder, rotary means for supporting and presenting the holder to the die, means for heating said die, intermittent means for feeding paper across the die, in combination with a hollow punch, a stripper through which the punch operates, a flanging head reciprocating with variable speed through the punch and die, and automatic means for operating said other means.

21. In a bottle bottoming machine, a rapidly rotating disk adapted to heat the bottom edges of a paper bottle by frictional contact and having an annular groove in which said edges are received, said groove being curved in cross section to bead the edges of the paper bottle by the pressure of the disk against the frictionally heated paper, in combination with means for rotating the disk, means for simultaneously pressing it against the paper bottle, and means for ejecting the beaded bottle, said pressing means also actuating the ejecting means.

22. In a machine for making bottles, a spinner-wheel, means for rotating said wheel, means for moving it in the direction of its axis of rotation into contact with an end of a bottle, and means comprising a lever in two adjustable parts to regulate the distance of said last movement of the spinner-wheel.

23. In a bottle bottoming machine, the combination of a hollow bottle-holder and a rotary bottle holder carrier, a device for seating the paper cones to be bottomed in a holder, a glue supplying device, a bottom punching, forming and placing device, comprising a shaft and a wheel mounted in a fixed manner on said shaft the periphery of said wheel being coated with an adhesive agent, said shaft having gyratory movement without rotation, and a bead spinning device, all said devices being at separate stations reached by said rotary carrier, and means after a bottle has been bottomed by the operation of said means, for unseating and discharging it from the carrier.

24. In a machine for making vessels, the combination of a body-member carrier, an expelling plunger to loosen the vessel in said carrier, and projectile means to complete the expulsion of said vessel by a short, quick, shooting impulse.

25. In a machine for making paper vessels, the combination of a body-member carrier, means for forming and placing a transverse member in a body-member, a head, and means to loosen the body by contact with and gradual pressure from the head and means to eject the body by a quick impulse of the head.

26. In a machine for making paper vessels, a body ejector comprising a hollow reciprocating barrel, a head having a stem seated in the hollow barrel, means to move the barrel to bring the head in contact with the body to loosen it and means after the body is loosened to move the head with a quick impulse against the body.

27. In a machine for making paper vessels, a body ejector comprising a hollow reciprocating barrel, a head, a stem for said head seated in the hollow barrel, means by moving the barrel to bring the head in contact with the vessel body to loosen it, a spring in the hollow barrel to move the head toward the body by moving the stem, means to compress the spring and hold the stem in retracted position, and means to release the spring and stem.

28. In a machine for making paper vessels, the combination with a traveling body-member carrier of a glue supplying means, means for forming and placing a transverse member in a body-member in said carrier said means being at separate stations and means to actuate said forming and placing means only when a body-member is presented respectively to them by the carrier.

29. In a machine for making paper vessels, the combination of a traveling body-member carrier, a glue supply means, means for forming and placing a transverse member in a body-member in said carrier, all of said means being at separate stations, and means actuated by the absence of a body-member in the carrier for rendering said other means inoperative when an empty carrier reaches a station of any of said other means.

30. In a machine for making paper vessels, requiring a series of operations to be performed in regular sequence, the combination of a traveling body-member carrier, means to perform the series of operations at separate stations and means actuated by the absence of a body-member in the carrier for rendering said other means inoperative when an empty carrier reaches a station of any of said other means.

31. In a bottle bottoming machine, the combination with a traveling bottle carrier of means for seating paper cones to be bottomed in said carrier, a glue supplying means, a bottom punching, forming and placing means, all of said means being at separate stations reached by the carrier, and means actuated by the absence of a paper cone in the means for seating the cones in the carrier for rendering said other means inoperative when the empty carrier reaches the stations of each of said means.

32. In a bottle bottoming machine, the combination with a rotary wheel having a plurality of receptacles to receive paper cones to be bottomed, means for seating the cones in said receptacles, a glue supplying means, a bottom punching, forming and placing means, said last two means being at separate stations by the side of the rotary wheel, means actuated by the absence of a cone in the means for seating the cones in the carrier for rendering the glue supplying means inoperative when the empty carrier reaches its station, and means actuated by said last means for rendering the bottom punching, forming and placing means inoperative when the empty carrier reaches that station.

33. In a machine for making paper vessels, the combination with a rotary body-member carrier having a plurality of body receiving holders, of a receptacle from which the bodies are transferred to the holders of the carrier, means for making said transfer, means for seating the previously loose bodies firmly in their respective holders, and means for successively supplying vessel bodies to said receptacle comprising an endless conveyer.

34. In a machine for making paper vessels, the combination of a rotary body-member carrier having a plurality of body receiving holders, a receptacle from which the bodies are transferred successively to the holders of the carrier, means for making said transfers and means for successively supplying vessel-bodies to said receptacle comprising an endless conveyer, a plurality of individual body carriers on said conveyer adapted to pass said receptacle in succession by the travel of said endless conveyer and means to discharge the vessel body from the carrier to the receptacle as the carrier passes the latter.

35. In a machine for making paper vessels, the combination of a rotary body-member carrier having a plurality of body receiving holders, a receptacle from which the bodies are successively transferred to the holders of the carrier, means for making said transfers, an endless conveyer, a plurality of individual body carriers on said conveyer which pass said receptacle in succession by the travel of said endless conveyer and means to discharge the vessel-body from the carrier to the receptacle as the carrier passes the latter comprising a rod pivoted externally of the endless conveyer and terminating in the path of the carriers as they pass said receptacle and entering a slot in the bottom of the carrier.

36. In a machine for making paper vessels, the combination of a rotary body-member carrier having a plurality of body receiving holders, a receptacle from which the bodies are transferred to the holders of the carrier, means for successively supplying vessel-bodies to said receptacle and means for transferring the bodies from the receptacle to the holders of the carrier, said means comprising a rod adapted to translatory movement longitudinally of said receptacle, a head on said rod to contact a vessel-body, a pair of stops on said rod, a sleeve on the rod between the stops, resilient means for holding the sleeve normally against the rear stop, a cam operated lever and means connecting the lever with said sleeve.

37. In a machine for making paper vessels requiring a series of operations to be performed separately but in sequence, the combination of a traveling body-member carrier, means to perform the separate operations in sequence, a receptacle from which the bodies are transferred one at a time to the carrier, means for supplying said bodies successively to the receptacle, a rod adapted to be reciprocated longitudinally through the axis of the receptacle, a head on said rod to contact a vessel-body and transfer it to the carrier, means to reciprocate the rod a normal distance during the operation of transferring a body from the receptacle to the carrier, means for imparting a greater travel than said normal travel to the rod when there is no vessel-body in the receptacle to be transferred and means operated by said further travel for rendering inoperative said means for performing in sequence the several separate operations on the vessel-body.

38. In a machine for making paper vessels, the combination of a rotary body-member carrier having a plurality of hollow truncated conical body-holders, a reciprocating head to seat vessel-bodies one at a time in said holders as they are brought opposite said head, means to supply glue on the inner wall of a seated vessel-body, a transverse wall forming and placing means, means actuated by a further travel of the body seating means caused by the absence of a body to be seated for rendering the glue applying means inoperative and other means likewise actuated to render the transverse wall forming and placing means inoperative but at a later period than the glue applying means is made inoperative in order that a body in advance of a coming vacancy may be supplied with a transverse wall although the glue supplying operation was interrupted where the vacancy occurred.

39. In a machine for making paper vessels, the combination of a rotary body-member carrier having a plurality of body-holders, a reciprocating head to seat vessel-bodies *seriatim* in said holders as they are brought in position by the movement of the rotary carrier, means to supply glue on the inner wall of the seated vessel-body, a transverse-wall forming and placing means, means by a travel of the body seating means beyond the normal travel in seating a body, occasioned by the absence of a body to be seated, for rendering the glue applying means inoperative, other like means to render the transverse-wall forming and placing means inoperative but later than the inoperative period of the glue applying means whereby a body in advance of a coming vacancy will be supplied with a transverse-wall but the glue supplying operation will be interrupted where the vacancy occurred and means to keep the glue applying mechanism in time with the transverse-wall forming and placing means.

40. In a means to apply glue to the inner wall of a vessel-body, the combination of a body-holder, a circular disk having a glue coated periphery the diameter of said disk being considerably less than the inside diameter of the vessel-body, means for moving the disk sidewise into the body, means to move it laterally to contact the periphery of the disk with the inner wall of the body, means to gyrate the disk without rotation on its own axis to slide its periphery around the body in contact with the latter, means to return the disk to the center of the body out of contact with the body, and means to withdraw it from the body.

41. In a means to apply glue to the inner wall of a vessel-body, the combination of a body-holder, a pot containing liquid glue, a rotating wheel submerged in said glue, a circular disk, means for moving the disk into contact with said glue-wheel, means for rotating the disk with its periphery against that of the glue-wheel to cover its periphery with glue, the diameter of said disk being considerably less than the inside diameter of said vessel-body, means for moving the disk sidewise into the body, means for moving it laterally into contact with the inner wall of the body, means to gyrate the disk without rotation on its own axis to slide its periphery around the body in contact with the latter, means to return the disk to the center of the body and out of contact with the body and means to withdraw the disk from the body.

42. In a machine for making paper vessels, a holder containing a vessel-body to which glue has been applied to its inner wall, in combination with means for forming and placing a transverse flanged wall in the vessel where the glue has been applied, said means comprising a wall-blank forming die, a flange forming die of reduced diameter extending therefrom toward the vessel-body holder, a hollow punch to coöperate with said blank forming die, a flanging and seating punch mounted in said hollow punch and coöperating with the flanging die, a planetary gear mechanism, a rotary crank, a pitman connecting the crank with the hollow punch and a pitman connecting the inner flanging and seating punch with said planetary gear mechanism said last pitman being split longitudinally and spread apart to straddle said hollow punch driving mechanism.

43. In a machine for forming and placing a transverse flanged wall between the glue coated walls of a paper vessel, the combination of a wall-blank forming die, a flange forming die of reduced diameter extending therefrom and having rounded edges next to the wall-blank forming die, a steam jacket surrounding and heating said dies, a hollow punch to coöperate with said blank forming die, a flanging and seating punch mounted in said hollow punch and coöperating with said flanging die, a planetary gear mechanism, a rotating crank, a pitman connecting the crank with the hollow punch, and a pitman connecting the inner flanging and seating punch with said planetary gear mechanism said last pitman being longitudinally split and spread apart to straddle said hollow punch driving mechanism.

In witness whereof, we have hereunto set our hands and seals at Indianapolis, Indiana, this 31st day of October, A. D. one thousand nine hundred and twelve.

HARRY D. CAYLOR.  [L. S.]
  WILLIAM ALLISON SCOTT. [L. S.]

Witnesses:
 F. W. WOERNER,
 L. B. WOERNER.